US009496954B2

(12) United States Patent
Hayakawa et al.

(10) Patent No.: US 9,496,954 B2
(45) Date of Patent: Nov. 15, 2016

(54) SENSOR TERMINAL

(75) Inventors: Miki Hayakawa, Tokyo (JP); Norio Ohkubo, Tokyo (JP); Yoshihiro Wakisaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 14/239,588

(22) PCT Filed: Sep. 6, 2011

(86) PCT No.: PCT/JP2011/070276
§ 371 (c)(1),
(2), (4) Date: Feb. 19, 2014

(87) PCT Pub. No.: WO2013/035161
PCT Pub. Date: Mar. 14, 2013

(65) Prior Publication Data

US 2014/0186051 A1 Jul. 3, 2014

(51) Int. Cl.
*H04B 10/114* (2013.01)

(52) U.S. Cl.
CPC ................................ *H04B 10/1143* (2013.01)

(58) Field of Classification Search
CPC ....... G08C 19/02; G08C 23/04; G08C 17/02
USPC .......... 340/870.29, 10.51, 12.5, 447, 539.16, 340/573.1, 854.4, 870.09; 398/108, 109
See application file for complete search history.

(56) References Cited

U.S. PATENT DOCUMENTS 8,456,278 B1 * 6/2013 Bergman ................ H04L 69/18 340/5.8
2007/0275750 A1 11/2007 Nakagawa
2008/0260391 A1 10/2008 Asukai et al.
2008/0297373 A1 * 12/2008 Hayakawa ............... H04Q 9/00 340/870.39
2010/0277342 A1 * 11/2010 Sicurello .................. H04Q 9/00 340/870.3
2010/0277696 A1 * 11/2010 Huebner ................ B60K 35/00 352/81
2012/0070152 A1 * 3/2012 Preston ................... F41A 33/02 398/115

FOREIGN PATENT DOCUMENTS

JP 62-147846 A 7/1987
JP 1-119233 U 8/1989
JP 06-350533 A 12/1994
JP 09-305277 A 11/1997

(Continued)

OTHER PUBLICATIONS

Japanese Office Action received in corresponding Japanese Application No. 2013-532348 dated Sep. 30, 2014.
Daniel Olguin Olguin, et al.,"Sensible Organizations: Technology and Methodology for Automatically Measuring Organizational Behavior.", IEEE Transactions on Systems, Man, and Cybernetics-Part B: Cybernetics. vol. 39, No. 1, pp. 43-55. Feb. 2009.

*Primary Examiner* — George Bugg
*Assistant Examiner* — Sharmin Akhter
(74) *Attorney, Agent, or Firm* — Mattingly & Malur, PC

(57) ABSTRACT

According to an embodiment of the preset invention, in a sensor terminal that is worn by a person, and detects that respective wearers face each other by the aid of an optical communication, a plurality of optical transmit/receive units each having at least one of a transmission unit that emits the light to transmit data, and a reception unit that receives the light to receive the data is arranged within the housing, and the plurality of optical transmit/receive units is arranged so that light emission axes of the transmission units, or extension lines of light detection axes of the reception units approaches each other.

8 Claims, 23 Drawing Sheets

FRONT VIEW

(56) References Cited

FOREIGN PATENT DOCUMENTS

| | | | |
|---|---|---|---|
| JP | 10-285117 | A | 10/1998 |
| JP | 2001-044452 | A | 2/2001 |
| JP | 2001-103010 | A | 4/2001 |
| JP | 2005-218066 | A | 8/2005 |
| JP | 2006-303866 | A | 11/2006 |
| JP | 2006-339879 | A | 12/2006 |
| JP | 2008-199569 | A | 8/2008 |
| JP | 2008-301071 | A | 12/2008 |
| JP | 2011-130304 | A | 6/2011 |

* cited by examiner

TOP VIEW

FRONT VIEW

BOTTOM VIEW

RIGHT SIDE VIEW

LEFT SIDE VIEW

REAR VIEW

FRONT VIEW

REAR VIEW

REAR VIEW

INSTALLATION USING CLIP

INSTALLATION USING STRING

INSTALLATION USING CLIP ATTACHED TO MAIN BODY

INSTALLATION USING WIRE CONNECTION

INSTALLATION USING FLEXIBLE SUBSTRATE

TRIR1 ANGLED

TRIR2 ANGLED

SENSOR TERMINAL

TECHNICAL FIELD

The present invention relates to a sensor terminal that detects facing of wearers, and particularly to a sensor terminal that detects the facing of the wearers with the use of an optical communication.

BACKGROUND ART

In a field of intellectual production, not labor but knowledge is main production means. However, in recent years, the knowledge has been rapidly obsoleted with the evolution of a constantly advancing technology, and intellectual workers themselves cannot maintain their expertise. The intellectual workers of today are required to always improve a capability and knowledge for maintaining their expertise. Also, the intellectual workers of today are required to provide a consensus formation skill for actualizing diverse values underlying a stakeholder through discussion, and rapidly making a decision of an organization.

In order that the organization maintains a competing power in the intellectual production, it is essential to objectively and precisely evaluate a decision making process of the intellectual workers configuring their organization, and always change actions of the intellectual workers within the organization.

Instead of the organization evaluation by a conventional qualitative evaluation depending on individual skills, a technology has been developed in which a communication within the organization is visualized by the aid of a sensor technology, and a quality of the intellectual production process is objectively evaluated.

Hardware, a system, and an analysis technique of the sensor terminal have been disclosed in which facing of persons is recorded with the use of an infrared transmitter provided in each of terminals dangled from persons' necks, and information on one person who faces another person, and information acquired by an acceleration sensor are synthesized for visualizing the communication within the organization (for example, refer to Nonpatent Literature 1).

In a system disclosed in Nonpatent Literature 1, the sensor terminal includes a pair of infrared transceivers for detecting a face-to-face communication. Because infrared rays are high in directivity as compared with radio, the infrared transceivers do not undergo reaction only when the respective wearers stay in proximity to each other sideways or backward, and are excellent in accurately detecting that the respective wearers face each other.

In most cases, the infrared rays are used in the system of this type, but the optical communication may use a light different in wavelength from the infrared rays (for example, a visible light and an ultraviolet light) if linearity and directivity are generally high.

Within the organization, there are not only a case in which two persons having the similar body types face each other, but also a case in which wearing positions of the sensor terminals of facing persons are different from each other due to a difference in the body type, a case in which one of the facing persons sits, and a case in which the facing persons are displaced from front face positions to face each other. A sensor terminal has been disclosed in which a plurality of infrared transceivers is arranged with an alteration of angles in order to detect the above-mentioned facing while limiting a communication range of the infrared communication to a desired range (for example, refer to Patent Literature 1).

The sensor terminal disclosed in Patent Literature 1 includes diverse sensors in addition to the infrared transceiver, in order to more precisely acquire states of people configuring the organization. Specifically, the diverse sensors include an acceleration sensor for detecting an orientation and motion of the sensor terminal, a microphone for acquiring speech and environmental sound, and a temperature sensor and an illumination sensor for acquiring the environment. Those sensors are easily affected by a variation in supply voltage and a radiation noise because the sensors deal with a minute analog signal. In particular, during the operation of the infrared transmitter, a large current of hundreds of mA to several A instantaneously flows into a circuit board of the sensor terminal at the timing of emitting the infrared rays. Therefore, special consideration needs to be given to a power supply design and a circuit arrangement for the purpose of preventing the diverse sensors from being affected by the variation in the supply voltage and the radiation noise from circuit lines.

CITATION LIST

Patent Literature

Patent Literature 1: Japanese Unexamined Patent Application Publication No. 2008-301071

Nonpatent Literature

Nonpatent Literature 1: Daniel Olguin Olguin, et al., "Sensible Organizations: Technology and Methodology for Automatically Measuring Organizational Behavior.", IEEE Transactions on Systems, Man, and Cybernetics-Part B: Cybernetics. Vol. 39, No. 1, pp. 43-55. February, 2009.

SUMMARY OF INVENTION

Technical Problem

It is essential that the above-mentioned wearable sensor terminal is small in size and lightweight for the purpose of preventing the wearer from feeing a burden. Also, in order that the sensor terminal detects a face-to-face communication between the persons without any omission, the sensor terminal needs to provide a plurality of optical communication transceivers.

However, in order that the plurality of optical communication transceivers is arranged in the sensor terminal with an alteration of the angles, a space in which the optical communication transceivers are positioned at desired angles needs to be provided within a housing. Also, because all of the optical communication transceivers mounted on the sensor terminal cannot be arranged on a single circuit board, the sensor terminal has a structure in which the circuit board on which a plurality of sensors is arranged and a control board of the sensor terminal are connected to each other by a plurality of electric wires. Further, in order to prevent the plurality of sensors from being affected by the noise radiated from the electric wires that connect the circuit board on which the plurality of sensors is arranged, and the control board of the sensor terminal, which is caused by the large current flowing in the sensor terminal when the optical communication transceivers emit a light, the plurality of sensors is arranged at distances from the electric wires. Also, consideration needs to be given to implementation such that the electric wires are shielded by a metal conductor. At the same time, in order to prevent the characteristic of the sensors from being degraded by a variation in the supply voltage, a large number of bypass capacitors each having a sufficient electrostatic capacitance must be arranged in a power line for supplying a power for driving the optical communication transceivers and the sensors.

As described above, an increase in an implementation volume for implementing the plurality of optical communication transceivers in the sensor terminal, and an increase in a circuit scale for preventing the noise from being input to the sensors cause an increase in the dimension, volume, and weight of the overall sensor terminal, and a reduction in toughness.

The present invention aims at providing a sensor terminal in which a plurality of optical communication transceivers is arranged with an alteration of angles, and the sensor terminal can be downsized and toughened while detecting face-to-face information of respective wearers without any omission.

Solution to Problem

One typical example of the invention disclosed in the present application will be described below. That is, there is provided a sensor terminal that is worn by a person, and detects that respective wearers face each other by the aid of an optical communication, including a control unit that controls the sensor terminal; and a plurality of optical transmit/receive units each having at least one of a transmission unit that emits the light to transmit data, and a reception unit that receives the light to receive the data, in which the plurality of optical transmit/receive units is arranged within a housing of the sensor terminal, and the plurality of optical transmit/receive units is arranged so that light emission axes of the transmission units, or extension lines of light detection axes of the reception units approaches each other.

Advantageous Effects of Invention

According to one aspect of the present invention, an opening portion formed in the housing for allowing the light to be transmitted therethrough can be reduced, and the sensor terminal can be downsized and roughened.

DESCRIPTION OF EMBODIMENTS

Hereinafter, embodiments of the present invention will be described with reference to the drawings. For clarification of the description, the following description and drawings will be appropriately omitted and simplified. Also, in the respective drawings, the same elements are indicated by identical reference symbols, and for clarification of the description, a repetitive description will be omitted as needed.

The embodiment of the present invention is characterized in that a plurality of optical transceivers provided in a sensor terminal is arranged toward the outside of a housing of the sensor terminal so that optical axes of a plurality of transceivers are oriented toward a perpendicular surface to a surface surrounded by a plurality of optical transceivers.

With the above configuration, an opening portion formed in the housing for allowing the light to be transmitted therethrough can be reduced, and the sensor terminal can be downsized and reduced in weight.

Hereinafter, the embodiments of the present invention will be described with reference to FIGS. 1 to 16.

For the purpose of clarifying the positioning and functions of the nameplate type sensor terminal according to the present invention, a business microscope system will be first described. In this case, the business microscope system is a system in which a status of a wearer which is acquired by the nameplate type sensor terminal worn by a person, and a status around the wearer, and face-to-face information on the respective wearers are synthesized, a relationship between the persons and an evaluation (performance) of a current organization are illustrated as an organization activity to help an improvement in the organization.

Also, data related to face-to-face detection, action, and sound, which is acquired by the nameplate type sensor terminal, is collectively extensively called "organization dynamics data".

FIGS. 1A to 1H are illustrative views of the business microscope system according to the embodiment of the present invention, which are divided for convenience of the illustration, but the respective illustrated processing is executed in cooperation with each other.

<Description of Business Microscope System>

Figure 1A:
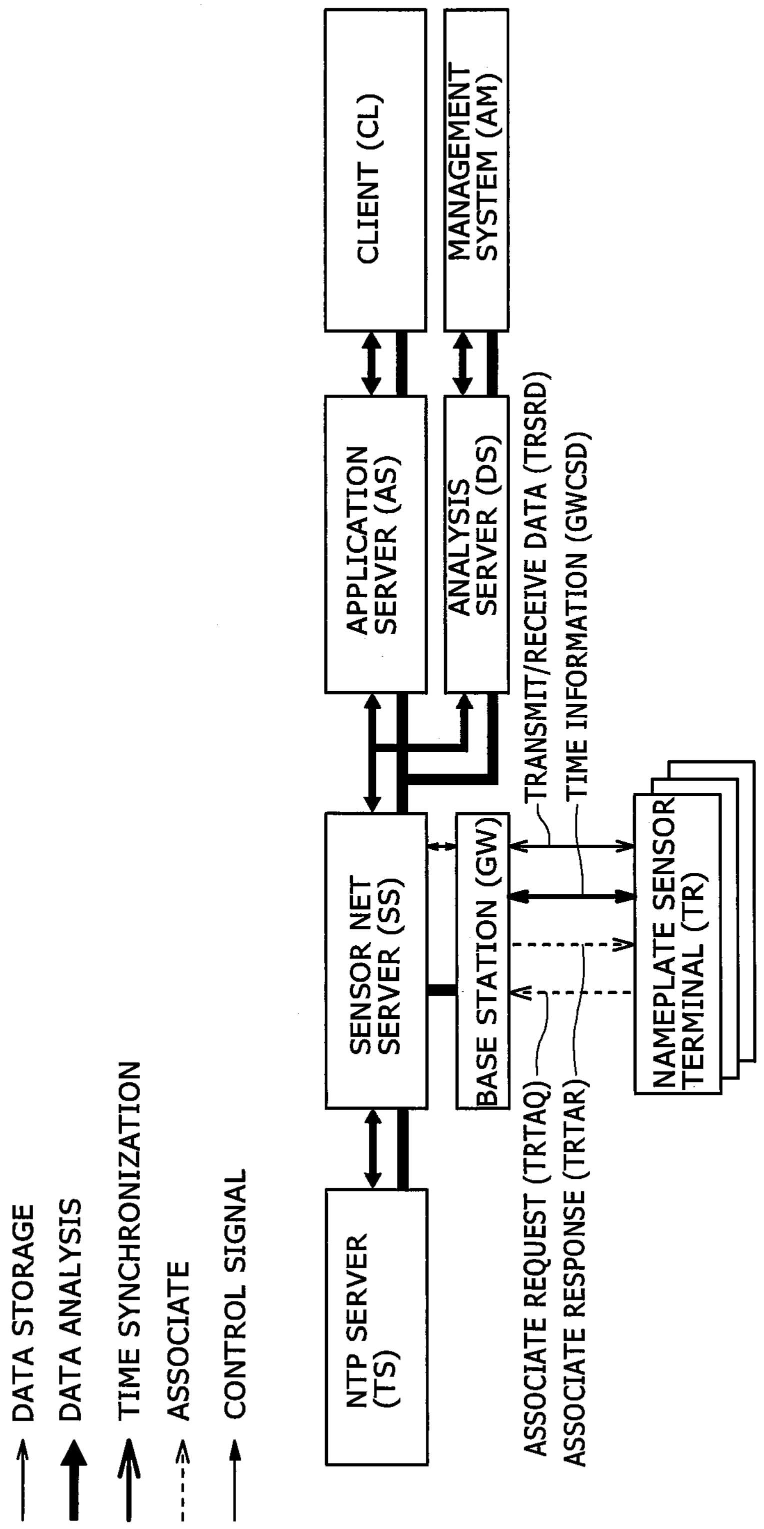
FIG. 1A is a system configuration diagram of a business microscope according to an embodiment of the present invention.

FIG. 1A is a system configuration diagram of a business microscope according to the embodiment of the present invention.

The business microscope system includes nameplate type sensor terminals TR, a base station GW, a sensor net server SS, an application server AS, a client CL, an analysis server DS, a management system AM, and an NTP (network time protocol) server TS.

The base station GW is connected to the nameplate type sensor terminals TR by a cradle or wirelessly, and can conduct a data communication with the nameplate type sensor terminals TR. Specifically, the nameplate type sensor terminals TR each transmit organization dynamics data to the base station GW, and receive various data from the base station GW. Data communicated between the nameplate type sensor terminals TR and the base station GW is called "transmit/receive data TRSRD". Also, the base station GW transmits time information GWCSD for synchronizing times of the plurality of nameplate type sensor terminals TR with each other to the nameplate type sensor terminals TR. The details of the nameplate type sensor terminals TR will be described with reference to FIG. 1B, and the details of the base station GW will be described with reference to FIG. 1C.

The sensor net server SS is connected to the base station GW by a network, and collects organization dynamics data from the base station GW, and stores the collected organization dynamics data therein. The details of the sensor net server SS will be described with reference to FIG. 1D.

The application server AS is connected to the sensor net server SS by the network, collects the organization dynamics data stored in the sensor net server SS, and analyzes the collected organization dynamics data. The details of the application server AS will be described with reference to FIG. 1E.

The client CL is connected to the application server AS by the network, and outputs an analysis result of the organization dynamics data by the application server AS to an audience. The details of the client CL will be described with reference to FIG. 1G.

A diagnosis server DS diagnoses whether the business microscope system normally operates, or not. The details of the diagnosis server DS will be described with reference to FIG. 1F.

The management system AM is connected to the diagnosis server DS by the network, requests the diagnosis server DS to diagnose the business microscope system, and outputs a diagnosis result by the diagnosis server DS to the audience.

The NTP server TS is connected to the sensor net server SS by the network, manages accurate time information, and transmits the accurate time information to the sensor net server SS.

Figure 1B:
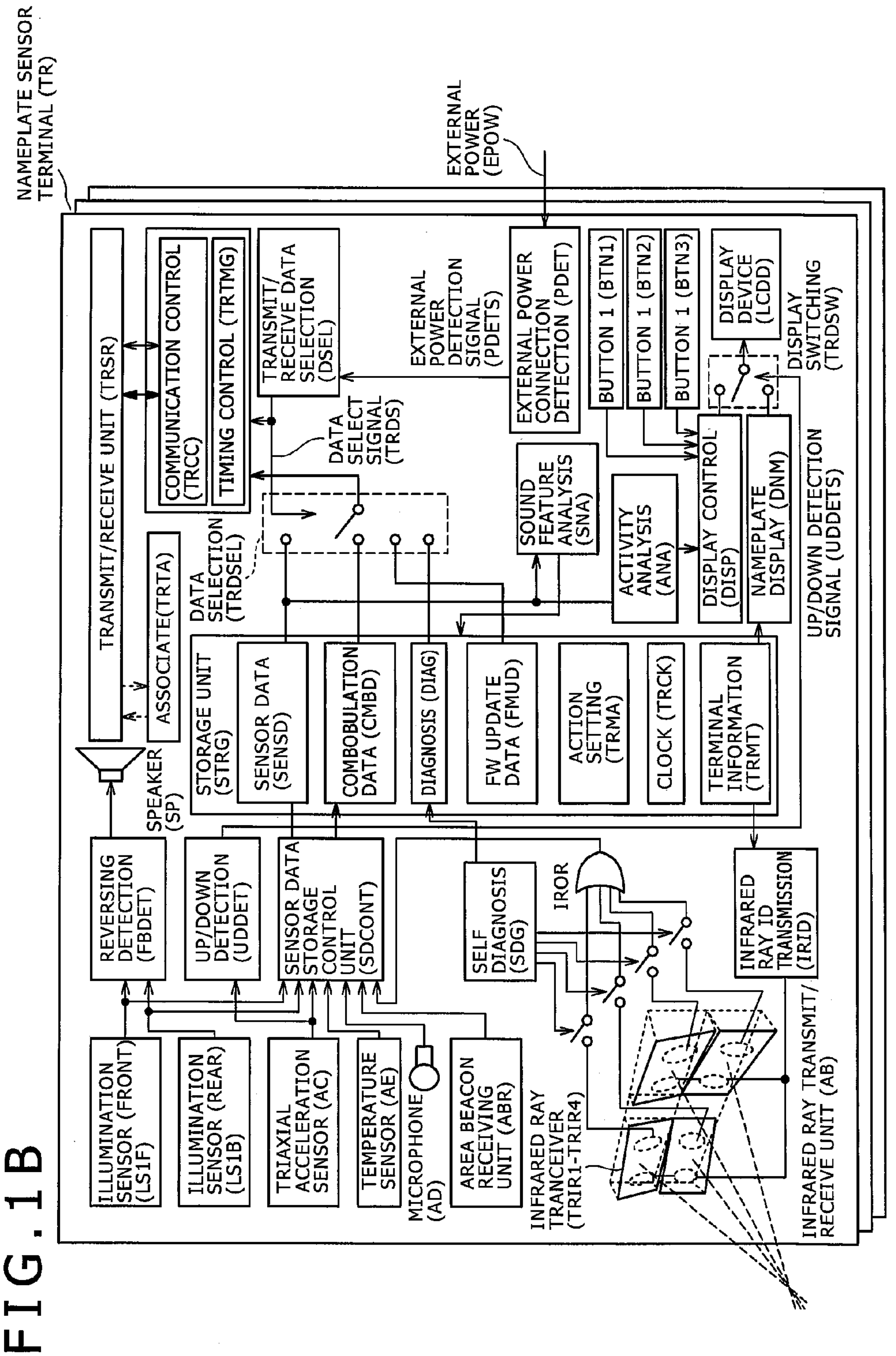
FIG. 1B is an illustrative view of a configuration of a nameplate type sensor terminal according to the embodiment of the present invention.

FIG. 1B is an illustrative view of a configuration of the nameplate type sensor terminals TR according to the embodiment of the present invention.

In order to acquire the organization dynamics data, each of the nameplate type sensor terminals TR includes an infrared transmit/receive unit AB, and various sensors. Also, in order to analyze and store the acquired organization dynamics data, the nameplate type sensor terminal TR includes a front-back detection unit FBDET, an up-down detection unit UDDET, a sensor data storage control unit SDCNT, an OR circuit IROR, a storage unit SRTG, a sound feature analysis unit SNA, and an activity analysis unit ANA. Also, in order to transmit and receive various data with respect to the base station GW, the nameplate type sensor terminal TR includes a transmit/receive unit TRSR, a communication control unit TRCC, a timing control unit TRTMG, a transmit/receive data selection unit DSEL, a data selection unit TRDSEL, and an associate unit TRTA.

Also, each of the nameplate type sensor terminals TR includes, as output means to the wearer, a display device LCDD, a display switching unit TRDSW, a display control unit DISP, a nameplate display unit DNM, and a speaker SP. Also, each of the nameplate type sensor terminals TR includes a bottom 1BTN1 to a bottom 3BTN3 that receive an input from the user. Also, each of the nameplate type sensor terminals TR includes an external power connection detection unit PDET that detects that an external power supply EPOW is connected thereto, and a self-diagnosis unit SDG that diagnoses whether an abnormality is present in infrared transceivers TRIR1 to TRIR4, or not.

The various sensors include a triaxial acceleration sensor AC, a microphone AD, illumination sensors LS1F, LS1B, and a temperature sensor AE. The triaxial acceleration sensor AC detects the operation of the wearer. The microphone AD detects a sound of speech of the wearer, and a sound around the wearer. The illumination sensors LS1F and LS1B detect an illuminance for the purpose of detecting two sides of the nameplate type sensor terminals TR. The illumination sensor LS1F is arranged on an upper side of the nameplate type sensor terminals TR, and the illumination sensor LS1B is arranged on a back side of the nameplate type sensor terminals TR.

The various sensors illustrated in FIG. 1B are exemplary, and the nameplate type sensor terminals TR may mount another sensor other than the various sensors illustrated in FIG. 1B thereon.

First, the infrared transmit/receive unit AB will be described.

The infrared transmit/receive unit AB periodically transmits terminal information TRMT stored in a storage unit STRG, which is unique identification information of the nameplate type sensor terminals TR. The infrared transmit/receive unit AB is configured by the plurality of infrared transceivers TRIR1 to TRIR4. The infrared transceivers TRIR1 to TRIR4 each emit infrared rays when transmitting information. However, the linearity and directivity of the infrared rays are higher than the linearity and directivity of electromagnetic waves, and the infrared transmit/receive unit AB is arranged on an upper side (front side) of the nameplate type sensor terminals TR.

For that reason, when a wearer of another nameplate type sensor terminal TR is located at a substantially front surface (for example, front surface or obliquely front surface) of a wearer of a subject nameplate type sensor terminal TR, the subject nameplate type sensor terminal TR and another nameplate type sensor terminal TR communicate the respective terminal information TRMT with each other by the infrared rays. With the above configuration, the nameplate type sensor terminals TR can store whom the subject person faces therein.

In each of the nameplate type sensor terminals TR, the plurality of infrared transceivers TRIR1 to TRIR4 are arranged with an alteration of the respective angles so as to surely detect the facing of the respective wearers even if the wearers face each other in any positional relationship.

Figure 2A:
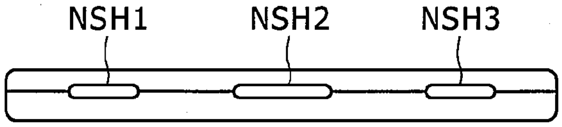
FIG. 2A is a top view of the nameplate type sensor terminal according to the embodiment of the present invention.
Figure 2B:
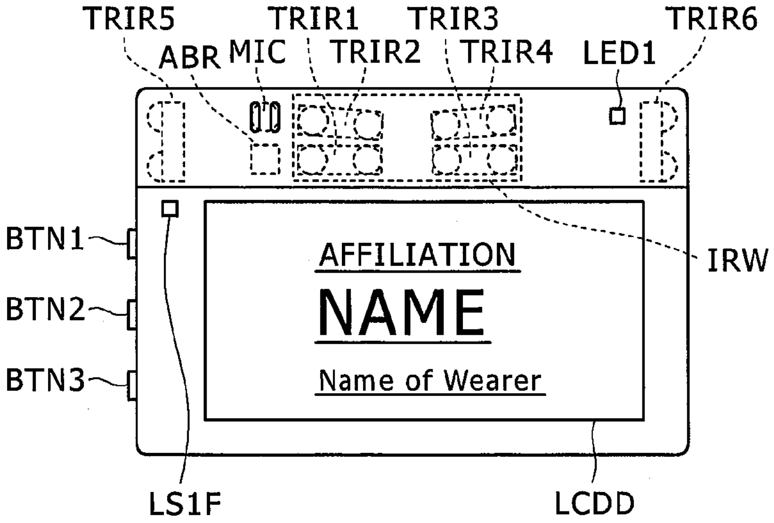
FIG. 2B is a front view of the nameplate type sensor terminal according to the embodiment of the present invention.

Although not illustrated in FIG. 1B, each of the nameplate type sensor terminals TR includes infrared transceivers TRIR5 and TRIR6 arranged on a left surface and a right surface, respectively, in addition to the infrared transceiver TRIR1 to TRIR4 (refer to FIG. 2B).

As described above, in general, the light is high in the linearity as compared with the electromagnetic waves of the other wavelengths. Also, it is easy to optically strictly control a communication range of the optical communication transceiver by a lens. Each of the nameplate type sensor terminals TR has the optical communication transceivers (infrared transceivers TRIR1 to TRIR4 in FIG. 1B) mounted thereon, thereby being capable of detecting not only that the wearer having another nameplate type sensor terminal TR merely comes in proximity to the subject wearer, but also that the respective wearers face each other. In this embodiment, the nameplate type sensor terminal TR having four pairs of infrared transceivers TRIR1 to TRIR4 that transmit and receive the infrared rays having an invisible wavelength mounted thereon is illustrated.

The number of infrared transceivers TRIR1 to TRIR4 mounted on each of the nameplate type sensor terminals TR is plural, but not limited to four. Also, in this embodiment, the infrared rays may be used. Alternatively, a visible light or an ultraviolet light may be used.

Each of the infrared transceivers is generally configured by the combination of an infrared emitting diode (infrared transmission unit) for transmitting the infrared rays, and an infrared phototransistor (infrared receiving unit) that receives the infrared rays.

Each of the infrared transceivers may not include both of the infrared transmission unit and the infrared reception unit. The infrared transceivers may include only the infrared transmission unit. The infrared transceivers may include only the infrared reception unit.

An infrared ID transmission unit IRID outputs the terminal information TRMT stored in the storage unit STRG to the infrared emitting diode. Upon receiving the terminal information TRMT, the infrared emitting diode emits the light in a light emitting mode indicative of the terminal information TRMT. The infrared ID transmission unit IRID may output other data except for the terminal information TRMT to the infrared emitting diode.

The present invention is characterized in that the infrared transceivers TRIR1 to TRIR4 are arranged toward the outside of the housing of the nameplate type sensor terminal TR so that optical axes of the infrared transceivers TRIR1 to TRIR4 are oriented toward the perpendicular surface to the surface surrounded by the infrared transceivers TRIR1 to TRIR4. Further, typically, the infrared transceivers TRIR1 to TRIR4 are arranged so that the respective optical axes of the infrared transceivers TRIR1 to TRIR4 cross each other outside of the housing. As a result, the opening portion for allowing the infrared rays to be transmitted therethrough can be reduced to contribute to the downsizing and roughening of the nameplate type sensor terminals TR.

All of the infrared phototransistors of the infrared transceivers TRIR1 to TRIR4 are connected to the sensor data storage control unit SDCNT through the OR circuit IROR. For that reason, if any one infrared photo transistor of the infrared transceivers TRIR1 to TRIR4 receives the infrared data, the nameplate type sensor terminal TR determines that the infrared data has been received.

It is needless to say that the respective infrared photo transistors may be connected to the sensor data storage control unit SDCNT not through the OR circuit IROR. In this case, each of the nameplate type sensor terminals TR can acquire additional information such that in which direction another facing nameplate type sensor terminal TR is oriented if the nameplate type sensor terminal TR grasps which infrared photo transistor is in a receivable state.

Subsequently, an area beacon reception unit (positional information reception unit) ABR will be described.

The infrared transceivers TRIR1 to TRIR4 communicate data with the use of the infrared rays high in the directivity for detecting that the respective wearers face each other. On the contrary, the area beacon reception unit ABR receives data with the use the infrared rays lower in the directivity than the infrared rays used for the infrared transceivers TRIR1 to TRIR4 to make a communication. A receive range of the infrared data by the area beacon reception unit ABR is larger than a receive range of the infrared photo transistor of the infrared transceivers TRIR1 to TRIR4. The area beacon reception unit ABR receives the infrared data indicative of an ID of the area beacon transmitted by the area beacon illustrated in FIG. 15, which is installed for each room such as a conference room. With this configuration, the application server AS can specify a room in which the wearer of the subject nameplate type sensor terminal TR is present, according to the ID received by the area beacon reception unit ABR of the nameplate type sensor terminal TR.

The infrared rays typically modulated by 38 kHz are used in a communication between the area beacon and the area beacon reception unit ABR because the communication is made in a broader range.

The self-diagnosis unit SDG is a circuit for determining a failure of the infrared transceivers TRIR1 to TRIR4 configuring the infrared transmit/receive unit AB. Specifically, the self-diagnosis unit SDG has a switch circuit that blocks the connection from the respective infrared emitting diodes of the infrared transceivers TRIR1 to TRIR4 to the OR circuit IROR to invalidate the infrared transceivers TRIR1 to TRIR4. In other words, the switch circuit is a circuit that can block an input of the data received by the respective infrared emitting diodes to the nameplate type sensor terminals TR.

With the above configuration, the self-diagnosis unit SDG can check whether a specific infrared receiving circuit can receive the infrared data, or not, individually, and can determine the failure of the infrared transceivers TRIR1 to TRIR4.

Subsequently, the storage unit STRG will be described.

The storage unit STRG is specifically configured by a nonvolatile storage device such as a hard disk or a flash memory.

Sensor data SENSD, combobulation data CMBD, diagnosis data DIAG, FW (firmware) update data FWUD, action setting TRMA, clock TRCK, and the terminal information TRMT are stored in the storage unit STRG.

The sensor data SENSD is data acquired by the illumination sensors LS1F and LS1B, the triaxial acceleration sensor AC, the temperature sensor AE, the microphone AD, the area beacon reception unit ABR, and the infrared transmit/receive unit AB. The sensor data SENSD is stored in the storage unit STRG by the sensor data storage control unit SDCNT. The sensor data SENSD is converted into a transmission packet by the communication control unit TRCC, and transmitted to the base station GW by the transmit/receive unit TRSR.

The transmission and reception of the data between the nameplate type sensor terminals TR and the base station GW may be conducted by a wireless system or a wired system. Each of nameplate type sensor terminals TR may continuously or intermittently continue to transmit the sensor data SENSD wirelessly, or may transmit the sensor data SENSD to the base station GW when the nameplate type sensor terminal TR is connected to the base station GW through a cable.

When each of the nameplate type sensor terminals TR transmits the sensor data SENSD to the base station GW, the timing control units TRTMG extracts the sensor data SENSD from the storage unit STRG, and also controls a timing at which to transmit the extracted sensor data SENSD to the base station GW. The timing control units TRTMG has a plurality of time bases not shown for generating a transmit timing.

The combobulation data CMBD is the sensor data SENSD accumulated in past. The diagnosis data DIAG is diagnosis results of the infrared transceivers TRIR1 to TRIR4 by the self-diagnosis unit SDG. FW update data FMUD is data for updating firmware which is a program for operating the nameplate type sensor terminals TR. The action setting TRMA is data for setting the action of the nameplate type sensor terminals TR (for example, display action to the display device LCDD). The clock TRCK is time information managed by the nameplate type sensor terminals TR, and is overwritten on accurate time information acquired from the NTP server TS at a given timing. The terminal information TRMT is IDs of the nameplate type sensor terminals TR transmitted from the infrared emitting diodes of the infrared transceivers TRIR1 to TRIR4.

The external power connection detection unit PDET detects that an external power EPOW is connected to the nameplate type sensor terminals TR, generates the external power connection detection unit PDET, and inputs the generated external power connection detection unit PDET to a transmit/receive data selection unit DSEL.

When receiving an external power detection signal PDETS, the transmit/receive data selection unit DSEL changes a transmit timing of the timing control units TRTMG, and controls the data selection unit TRDSEL to change data to be transmitted to the base station GW. Specifically, when receiving the external power detection signal PDETS, the transmit/receive data selection unit DSEL does not transmit the current sensor data SENSD to the base station GW since the nameplate type sensor terminal TR is being charged, but controls the data selection unit TRDSEL so as to combobulate the untransmitted combobulation data CMBD among the combobulation data CMBD, and transmit the combobulation data CMBD to the base station GW. Also, the transmit/receive data selection unit DSEL controls the data selection unit TRDSEL so as to receive the update data of the firmware from the base station GW.

Subsequently, the various sensors mounted on the nameplate type sensor terminals TR will be described.

The illumination sensor LS1F is arranged on an anterior surface (front surface) of the nameplate type sensor terminals TR, and the illumination sensor LS1B is arranged on a back surface of the nameplate type sensor terminals TR. Data acquired by the illumination sensors LS1F and LS1B is stored in the storage unit STRG by the sensor data storage control unit SDCNT, and the data acquired by the illumination sensor LS1F and the data acquired by the illumination sensor LS1B are compared with each other by the front-back detection unit FBDET.

When each of the nameplate type sensor terminals TR is correctly worn, the illumination sensor LS1F arranged on the anterior surface (front surface) of the nameplate type sensor terminal TR receives a light anterior to the wearer.

The illumination sensor LS1B mounted on the back surface of the nameplate type sensor terminal TR has a positional relationship interposed between the nameplate type sensor terminal TR and the wearer, and therefore receives no light. For that reason, when the nameplate type sensor terminal TR is correctly worn, an illuminance detected by the illumination sensor LS1F is larger than an illuminance detected by the illumination sensor LS1B.

On the other hand, when the nameplate type sensor terminal TR is worn inside out, the illumination sensor LS1B receives the light anterior to the wearer, and the illumination sensor LS1F does not receive the light because of the positional relationship interposed between the nameplate type sensor terminal TR and the wearer. For that reason, when the nameplate type sensor terminal TR is worn inside out, the luminance detected by the illumination sensor LS1F is smaller than the luminance detected by the illumination sensor LS1B.

In this example, the front-back detection unit FBDET can detect whether the nameplate type sensor terminal TR is worn inside out, or not, by comparing the illuminance detected by the illumination sensor LS1F with the illuminance detected by the illumination sensor LS1B. When detecting that the nameplate type sensor terminal TR is worn inside out, the front-back detection unit FBDET outputs a warning tone from the speaker SP, and notifies the wearer that the nameplate type sensor terminal TR is worn inside out.

The microphone AD acquires sound information. The nameplate type sensor terminal TR can specify an environment such as "loud" or "quiet" according to the sound information. The sound feature analysis unit SNA analyzes a person's voice included in the sound information to analyze the face-to-face communication. In this example, to analyze the face-to-face communication is to analyze whether the communication is active or static, whether the persons evenly have a conversation with each other, or any person one-sidedly tells, whether the person is laughing or angry, and so on. The sound feature analysis unit SNA typically analyzes a frequency of the acquired sound information, or analyzes a change in the energy of the acquired sound information, to thereby analyze the acquired sound information.

Further, even if the infrared transmit/receive unit AB cannot receive the infrared data due to a place of the wearer although the respective wearers face each other, the nameplate type sensor terminals TR can detect the facing of the wearers on the basis of the sound information acquired by the microphone AD and acceleration information acquired by the triaxial acceleration sensor AC.

The triaxial acceleration sensor AC also detects the acceleration data of the nameplate type sensor terminals TR, that is, the motion of the nameplate type sensor terminals TR. The nameplate type sensor terminal TR can analyze an intensity of an action such as walk and the motion of the wearer on the basis of the acceleration data acquired by the triaxial acceleration sensor AC. Further, the application server AS compares values of the accelerations detected by the plurality of nameplate type sensor terminals TR with each other to analyze an activation level of the communication between the wearers of those nameplate type sensor terminals TR, the rhythm of the respective wearers, and a correlation of the respective wearers.

The sensor data storage control unit SDCNT stores the acceleration data acquired by the triaxial acceleration sensor AC in the storage unit STRG as sensor data SENSD.

The up-down detection unit UDDET specifies an orientation of the nameplate type sensor terminals TR on the basis of the acceleration data acquired by the triaxial acceleration sensor AC. This uses a fact that a dynamic acceleration caused by the motion of the wearer and a static acceleration caused by a gravity acceleration of the glob are contained in the acceleration data acquired by the triaxial acceleration sensor AC.

When the wearer wears the nameplate type sensor terminal TR on his breast, individual information such as the affiliation and name of the wearer are displayed on the display device LCDD. In this case, the nameplate type sensor terminals TR function as nameplates.

On the other hand, when the wearer holds the nameplate type sensor terminal TR in this hand, and orients the display device LCDD toward him, a top and a bottom of the nameplate type sensor terminal TR are inverted. In this case, the analysis result of the sensor data SENSD by the activity analysis unit ANA is displayed on the display device LCDD.

That is, the display contents of the display device LCDD are switched according to an orientation of the nameplate type sensor terminal TR.

Specifically, the up-down detection unit UDDET detects that the top and the bottom of the nameplate type sensor terminals TR are inverted, on the basis of the acceleration data acquired by the triaxial acceleration sensor AC, and inputs an up/down detection signal UDDETS to the display switching unit TRDSW. When receiving the up/down detection signal UDDETS, the display switching unit TRDSW connects any one of the display control unit DISP and the nameplate display unit DNM, which is not connected to the display device LCDD, to the display device LCDD.

The display control unit DISP generates display data of the analysis results of the sensor data SENSD by the activity analysis unit ANA, and also receives inputs from the bottom 1BTN1 to the bottom 3BTN3.

Also, the nameplate display unit DNM generates the display data of the individual information such as the affiliation and name of the wearer on the basis of the terminal information TRMT.

The infrared transmit/receive unit AB transmits and receives the infrared data between the nameplate type sensor terminals TR to detect whether the nameplate type sensor terminal TR faces another nameplate type sensor terminal TR, or not, that is, whether the respective wearers of the nameplate type sensor terminals TR face each other, or not. For that reason, it is desirable that each of the nameplate type sensor terminals TR is worn on a front surface of the person.

Figure 1C:
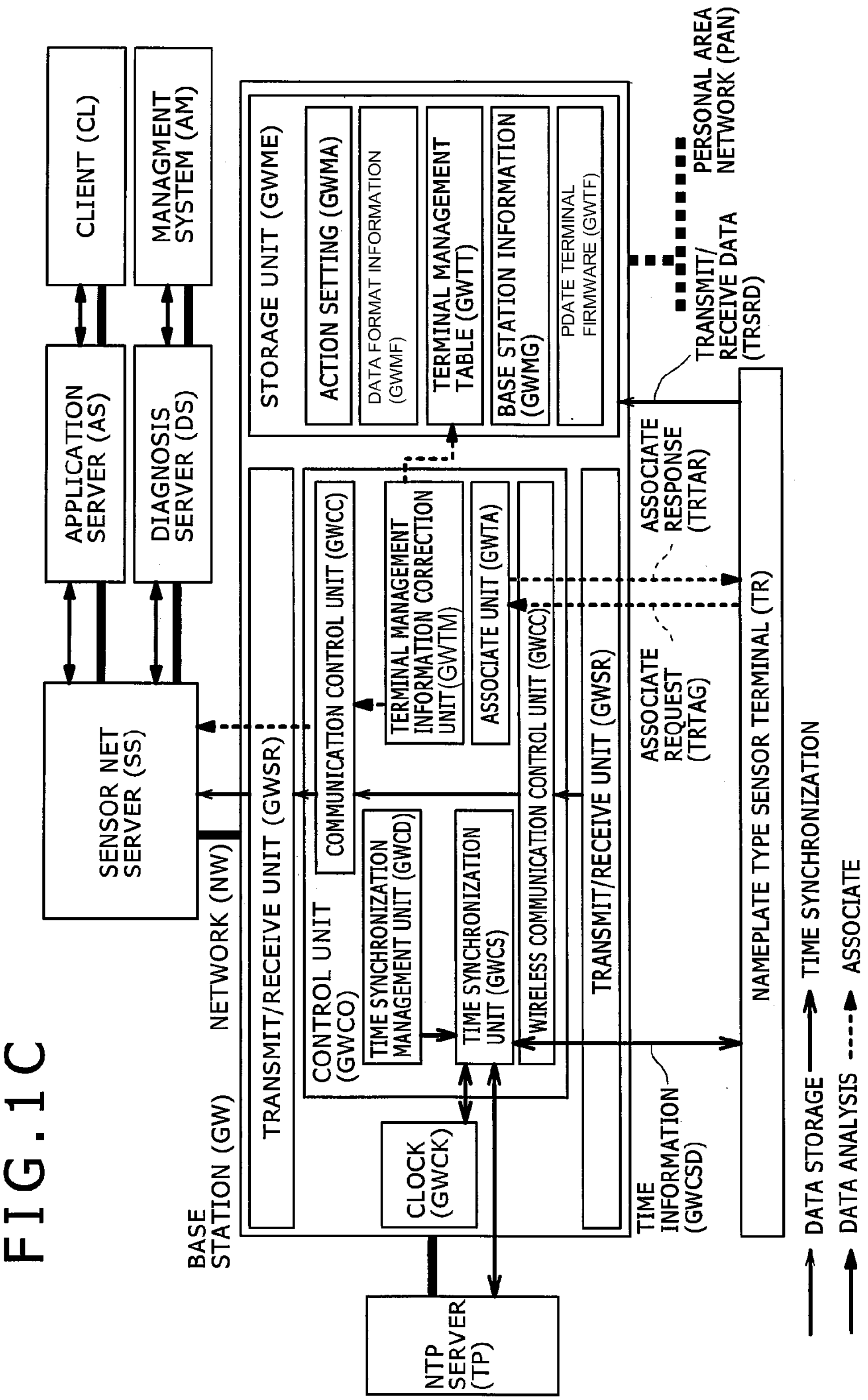
FIG. 1C is an illustrative view of a configuration of a base station according to the embodiment of the present invention.

The plurality of nameplate type sensor terminals TR is present in most cases, and each of the nameplate type sensor terminals TR is coupled to the closer base station GW to form a personal area network PAN (refer to FIG. 1C).

The temperature sensor AE acquires a temperature in a place where the nameplate type sensor terminal TR is present.

Each of the nameplate type sensor terminals TR can store data related to the environment by the illumination sensors LS1F, LS1B, and the temperature sensor AE.

Also, each of the nameplate type sensor terminals TR can detect that the wearer travels from one place to another place on the basis of the illuminance acquired by the illumination sensors LS1F and LS1B, and the temperature acquired by the temperature sensor AE.

The timing control units TRTMG controls a timing at which to transmit the above-mentioned sensor data SENSD to the base station GW, holds the time information GWCSD transmitted from the base station GW, and updates the clock TRCK to the time information GWCSD at given intervals. This is to prevent the clock TRCK from deviating from the clock TRCK of another nameplate type sensor terminals TR.

The sensor data storage control unit SDCNT controls sensing intervals of the various sensors on the basis of the action setting TRMA stored in the storage unit STRG, and also manages the data acquired by the various sensors.

The communication control unit TRCC converts the data to be transmitted to the base station GW into a transmission packet according to a data format corresponding to the transmission, and also converts a reception packet received from the base station GW into a data format within the nameplate type sensor terminal TR. The communication control unit TRCC may include a communication function which is not wireless but wired as needed. Also, the communication control unit TRCC may control the congestion of data transmission so that the subject nameplate type sensor terminal TR does not overlap in transmission timing with another nameplate type sensor terminal TR.

When the nameplate type sensor terminal TR is implemented to make a communication with the base station GW wirelessly, the associate TRTA transmits an associate request TRTAQ (refer to FIG. 1A) for the nameplate type sensor terminal TR forming the personal area network PAN (refer to FIG. 1C) in association with the base station GW illustrated in FIG. 1C is to the base station GW. Also, the associate TRTA receives an associate response TRTAR (refer to FIG. 1A) which is a response to the associate request TRTAQ from the base station GW. Then, the associate unit TRTA determines the base station GW that has transmitted the associate request TRTAQ as the base station GW to which data is to be transmitted.

The associate unit TRTA transmits the associate request TRTAQ when the nameplate type sensor terminal TR is powered on, and when the wearer travels, and cannot transmit and receive data with respect to the base station GW to and from which the nameplate type sensor terminal TR has transmitted and received the data up to then.

The associate unit TRTA transmits and receives the associate request TRTAQ and the associate response TRTAR with respect to the base station GW, to thereby associate the nameplate type sensor terminal TR with one base station GW within a range in which a wireless signal arrives from the nameplate type sensor terminal TR.

The transmit/receive unit TRSR transmits and receives data with respect to the base station GW. The communication between the transmit/receive unit TRSR and the base station GW may be a wireless communication or a wired communication. If the communication between the transmit/receive unit TRSR and the base station GW is the wired communication, the transmit/receive unit TRSR can transmit and receive the data with respect to the base station GW with the use of a connector for a wired communication. The transmit/receive data TRSRD transmitted or received with respect to the base station GW by the transmit/receive unit TRSR is transmitted or received through the personal area network PAN.

FIG. 1C is an illustrative view of a configuration of the base station GW according to the embodiment of the present invention.

The base station GW intervenes between the nameplate type sensor terminals TR and the sensor net server SS. Taking a wireless reach distance of the base station GW into account, the plurality of base stations GW is arranged so that an area of a cabin or a working place falls within a range of the wireless reach distance.

The base station GW includes a transmit/receive unit GWSR, a storage unit GWME, a clock GWCK, and a control unit GWCO.

The transmit/receive unit GWSR transmits and receives the data with respect to the nameplate type sensor terminals TR in a wireless or wired manner, and also transmits and receives the data with respect to the sensor net server SS through the network NW. When the base station GW and the nameplate type sensor terminals TR transmit and receive the data with respect to each other wirelessly, the transmit/receive unit GWSR includes an antenna for receiving the data wirelessly.

The storage unit GWME is a nonvolatile storage device such as a hard disk or a flash memory. At least action setting GWMA, data format information GWMF, a terminal management table GWTT, and base station information GWMG are stored in the storage unit GWME.

The action setting GWMA includes information indicative of an operating method of the base station GW.

The data format information GWMF includes information indicative of a data format for communication, and information for tagging organization dynamics data such as the sensor data SENSD received from the nameplate type sensor terminals TR.

The terminal management table GWTT includes the terminal information TRMT of the nameplate type sensor terminals TR under the currently communicatable base station GW, and the local IDs distributed for managing the nameplate type sensor terminals TR under the base station GW. The nameplate type sensor terminals TR under the currently communicatable base station GW are also called "associated nameplate type sensor terminals TR".

The base station information GWMG includes identification information such as an address of the base station GW per se.

Also, a pdate terminal firmware GWTF of the nameplate type sensor terminals TR is temporarily stored in the storage unit GWME.

A program to be executed by a central processing unit (CPU) (not shown) provided in the control unit GWCO may be stored in the storage unit GWME.

The clock GWCK holds time information. Time information held by the clock GWCK is updated in a given period. Specifically, the time information held by the clock GWCK is corrected to the time information acquired from the NTP server TS.

The control unit GWCO includes a CPU (not shown). The CPU executes a program stored in the storage unit GWME to manage a timing for acquiring the organization dynamics data from the nameplate type sensor terminals TR, processing related to the organization dynamics data from the nameplate type sensor terminals TR, a timing for transmitting and receiving the transmit/receive data TRSRD between the nameplate type sensor terminals TR and the sensor net server SS, and a timing for synchronizing the time information with respect to the NTP server TS. Specifically, the CPU executes the program stored in the storage unit GWME to function as a communication control unit GWCC, a terminal management information correction unit GWTM, an associate unit GWTA, a time synchronization management unit GWCD, a time synchronization unit GWCS, and the wireless communication control unit GWCC.

The communication control unit GWCC controls a communication timing between the nameplate type sensor terminals TR and the sensor net server SS in the wireless or wired manner.

Also, the communication control unit GWCC specifies the type of received data. Specifically, the communication control unit GWCC refers to a header portion of the received data, and specifies whether the received data is the organization dynamics data, data for associate, or a response of time synchronization, and delivers the received data to an appropriate function according to the specified type.

The communication control unit GWCC refers to the data format information GWMF stored in the storage unit GWME, converts the data into a format suitable for transmission and reception, and allocates tag information for indicating the type of data to the converted data.

The associate unit GWTA transmits the associate response TRTAR responsive to the associate request TRTAQ received from the nameplate type sensor terminal TR to the subject nameplate type sensor terminal TR, and also transmits the local ID which is allocated to the nameplate type sensor terminal TR that has transmitted the associate request TRTAQ. If an associate is established between the base station GW and the nameplate type sensor terminal TR, that is, if the base station GW and the nameplate type sensor terminal TR can be communicated with each other, the associate unit GWTA corrects terminal management information with the terminal management table GWTT and the pdate terminal firmware GWTF.

The time synchronization management unit GWCD controls an execution interval of time synchronization processing for synchronizing the time information, and an execution timing of the time synchronization processing, and inputs an instruction for the time synchronization unit GWCS to execute the time synchronization processing to the time synchronization unit GWCS.

Figure 1D:
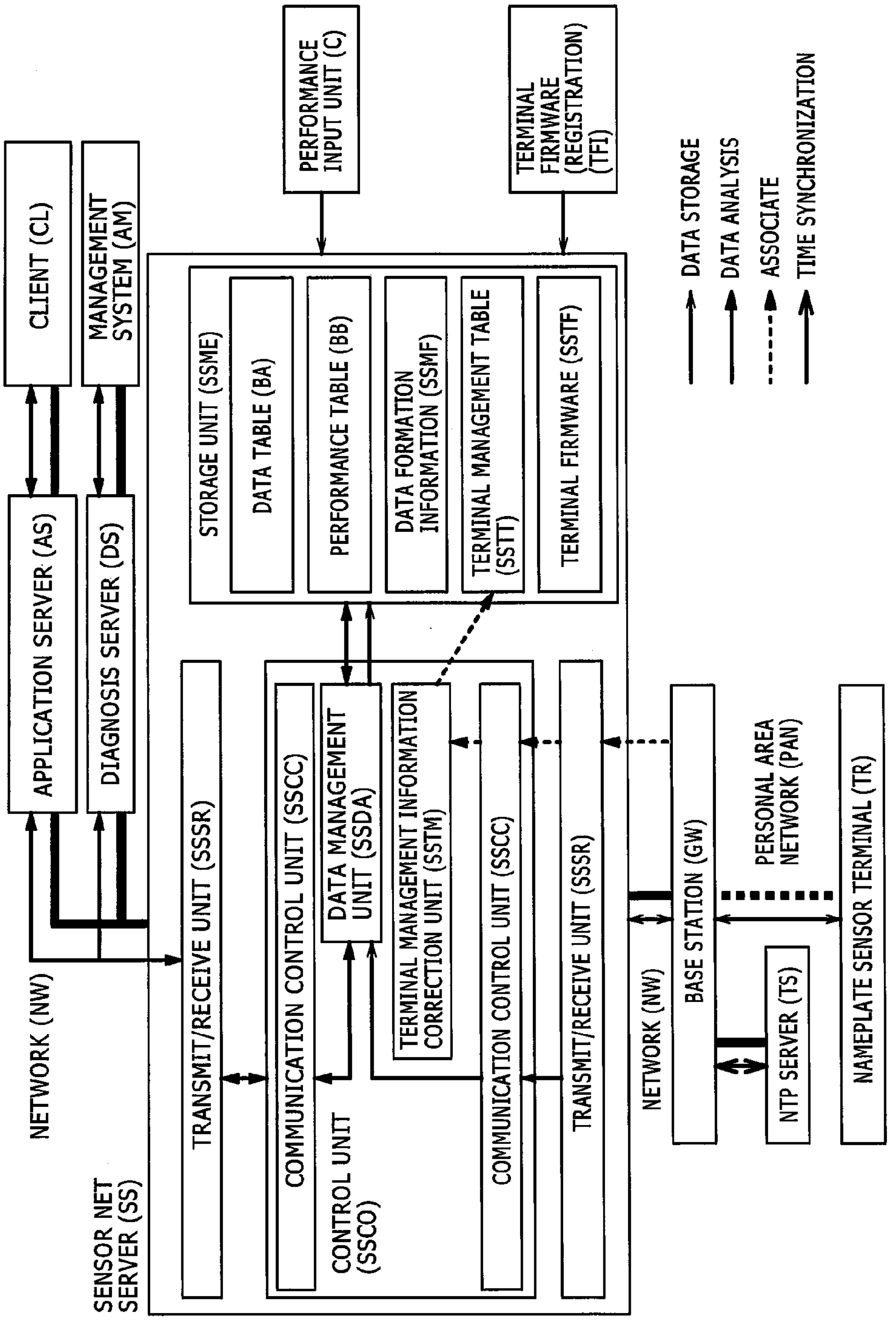
FIG. 1D is an illustrative view of a configuration of a sensor net server according to the embodiment of the present invention.

The sensor net server SS illustrated in FIG. 1D may have the time synchronization management unit. In this case, the base station GW may include the time synchronization management unit GWCD, and the time synchronization management unit provided in the sensor net server SS transmits the time information synchronized with the base station GW of the overall system.

The time synchronization unit GWCS acquires the time information from the NTP server TS connected to the base station GW through the network. Also, the time synchronization unit GWCS corrects the time information held by the clock GWCK to the time information acquired from the NTP server TS. Then, the time synchronization unit GWCS transmits an instruction for synchronizing the time information managed by the nameplate type sensor terminal TR with the time information managed by the base station GW to the nameplate type sensor terminal TR. The synchronization instruction for the time information includes the time information managed by the base station GW.

FIG. 1D is an illustrative view of the configuration of the sensor net server SS according to the embodiment of the present invention.

The sensor net server SS collects the sensor data from the nameplate type sensor terminals TR, and manages the collected sensor data. Specifically, the sensor net server SS stores the data transmitted from the base station GW into a storage unit SSME, and also transmits the organization dynamics data to the application server AS and the client CL on the basis of requests from the application server AS and the client CL.

Also, the sensor net server SS receives a control command from the base station GW, executes processing on the basis of the control command, and transmits the processing results to the base station GW.

The sensor net server SS includes a transmit/receive unit SSSR, the storage unit SSME, and a control unit SSCO.

When the base station GW does not execute the processing of the time synchronization management unit GWCD, but the sensor net server SS executes the processing of the time synchronization management unit GWCD, the sensor net server SS needs to provide a clock for holding the time information.

The transmit/receive unit SSSR transmits and receives the data with respect to the base station GW, the application server AS, and the client CL. Specifically, the transmit/receive unit SSSR receives the organization dynamics data transmitted by the base station GW, and transmits the received organization dynamics data to the application server AS or the client CL.

The storage unit SSME is configured by a nonvolatile storage device such as a hard disk or a flash memory. The storage unit SSME stores at least a data table BA, a performance table BB, data format information SSMF, a terminal management table SSTT, and a terminal firmware SSFT therein.

Also, the storage unit SSME may store may store a program which is executed by a CPU (not shown) in the control unit SSCO therein.

The data table BA is a database that stores the organization dynamics data acquired from the nameplate type sensor terminals TR, information on the nameplate type sensor terminals TR, and information on the base station GW that collects the organization dynamics data from the nameplate type sensor terminals TR therein. In the data table BA, a column is created for each element (acceleration, temperature, etc.) of the organization dynamics data. Also, a table may be created for each element of the organization dynamics data. Even in any cases, the organization dynamics data is stored in the data table BA with the terminal information TRMT of the nameplate type sensor terminal TR that acquires the organization dynamics data being associated with information related to a time at which the nameplate type sensor terminal TR acquires the organization dynamics data.

The performance table BB is a database for storing an evaluation (performance) related to the organization and the individuals in association with information related to a time at which the evaluation is input. The evaluation related to the organization and the individuals is input by a user through a performance input unit C. For example, when the user inputs the evaluation related to the organization and the individuals to the nameplate type sensor terminal TR, the nameplate type sensor terminal TR functions as the performance input unit C.

The data format for communication, a method in which the organization dynamics data tagged by the base station GW is sectioned for each tag, and recorded in the database, and a response method to a data request are stored in the data format information SSMF. As will be described later, a communication control unit SSCC always executes a data management SSDA with reference to the data format information SSMF after receiving data, and before transmitting the data.

Information indicative of which nameplate type sensor terminal TR is currently under the control of any base station GW is stored in the terminal management table SSTT. When the base station GW newly puts another nameplate type sensor terminal (TR) under the control, the base station GW transmits information including the identification information of itself and the terminal information TRMT of another nameplate type sensor terminals TR newly put under the control to the sensor net server SS. When receiving that information, the sensor net server SS updates the terminal management table (SSTT).

The pdate terminal firmware GWTF of the nameplate type sensor terminal TR stored in a terminal firmware registration unit TFI is temporarily stored in a terminal firmware SSTF.

The control unit SSCO includes a central processing unit (CPU) (not shown), and controls the transmission and reception of the organization dynamics data, and the storage and acquisition of the data in the database. Specifically, the CPU executes a program stored in the storage unit SSME to function as the communication control unit SSCC, a terminal management information correction unit SSTM, and the data management unit SSDA.

The communication control unit SSCC controls a communication timing with the base station GW, the application server AS, and the client CL. Also, when receiving the data, the communication control unit SSCC converts the received data into a data format within the sensor net server SS with reference to the data format information SSMF stored in the storage unit SSME. Also, when transmitting the data, the communication control unit SSCC converts the data to be transmitted into a data format specializing in a destination.

Further, the communication control unit SSCC distributes the received data to processing units corresponding to the type of the data with reference to a header portion of the received data. Specifically, when receiving data to be updated in the terminal management table SSTT, the communication control unit SSCC delivers that data to a terminal management information correction unit SSTM. When receiving the other data, the communication control unit SSCC delivers that data to the data management unit SSDA.

Also, the communication control unit SSCC determines a destination of the data to be transmitted to any one of the base station GW, the application server AS, and the client CL.

When receiving the data to be updated in the terminal management table SSTT, the terminal management information correction unit SSTM updates the terminal management table SSTT.

The data management unit SSDA manages the correction, acquisition, and addition of the data stored in the storage unit SSME. For example, the data management unit SSDA records the organization dynamics data in an appropriate column of the database for each element of the organization dynamics data on the basis of the tag information allocated to the organization dynamics data. Also, when reading the organization dynamics data from the data table BA, the data management unit SSDA executes processing so as to select necessary organization dynamics data on the basis of the time information and the terminal information, and rearrange the selected organization dynamics data in a time order.

Values (performances) indicative of the evaluations of the organization and the individuals are input to the performance input unit C. In this example, the performances are subjective and objective evaluation values determined on the basis of some criterion. For example, the performance input unit C receives, at a given timing, the subjective evaluation values (achievement of business, contribution to the organization, satisfaction level, and so on) based on some criterion at that time point by the wearer of the nameplate type sensor terminal TR. In this example, the given timing may be once every several hours, once a day, or a time point when an event of a conference has been finished.

The wearer of the nameplate type sensor terminal TR operates the nameplate type sensor terminal TR, or operates a personal computer (PC) of the client CL to input the performance related to the individual. Also, the performances related to the individual are handwritten by the wearer may be input to the PC in a lump later.

In this embodiment, the performances of a person (social), doing (intellectual), a heart (spiritual), a body (physical), and knowledge (executive) are input to the nameplate type sensor terminal TR as the performances related to the individual by the wearer.

The "social" means that "Is a productive human relationship (collaboration, sympathy) produced?", "intellectual" means that "can what to do be executed?", "spiritual" means that "Is your job worthwhile and fulfilling?", "physical" means that "can consideration (rest, fuel, exercise) be given to a body?", and "executive" means that "is a new knowledge (sense, knowledge) obtained?".

The performances related to the organization may be calculated on the basis of the performances related to the individual.

Also, the performances related to the organization may not be calculated on the basis of the subjective performances related to the individual, which is input by the wearer. For example, quantified objective data may be periodically input to the sensor net server SS as the performances related to the organization. The quantified objective data is, for example, the amount of sales, the costs, and the questionnaire result of clients.

Also, when numerical values such as an error incidence ratio in a production management can be automatically acquired, the acquired numerical values may be input to the sensor net server SS as the performances related to the organization.

Further, an economic indicator such as a gross national product (GNP) may be input to the sensor net server SS as the performances related to the organization.

Those input performance values are used in analysis processing of the organization dynamics data.

Figure 1E:
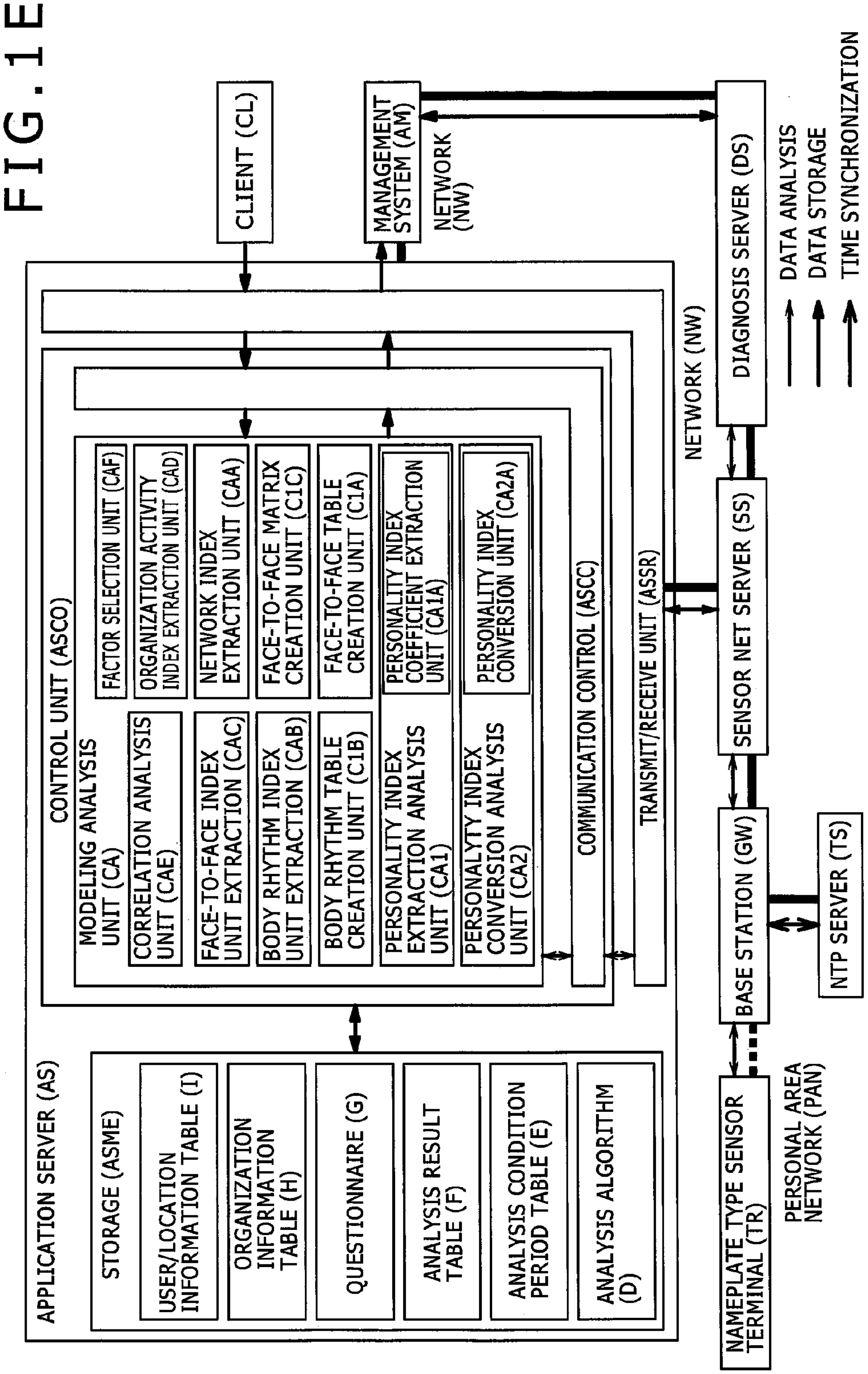
FIG. 1E is an illustrative view of a configuration of an application server according to the embodiment of the present invention.

FIG. 1E is an illustrative view of a configuration of the application server AS according to the embodiment of the present invention.

The application server AS acquires the organization dynamics data from the sensor net server SS, and executes the analysis processing and the other processing on the acquired organization dynamics data.

Specifically, when receiving an analysis request for the organization dynamics data from the client CL, or when arriving at a set time, the application server AS starts an analysis application. The analysis application functions as a modelization analysis unit CA illustrated in FIG. 1E, and acquires the organization dynamics data necessary for the analysis from the sensor net server SS. Then, the analysis application analyzes the acquired organization dynamics data, and transmits the analysis result to the client CL. The analysis application may store the analysis result in an analysis result table F without transmitting the analysis result to the client CL.

The analysis application is stored in an analysis algorithm D, and executed by a control unit ASCO.

The application server AS includes a transmit/receive unit ASSR, a storage unit ASME, and the control unit ASCO.

The transmit/receive unit ASSR receives the organization dynamics data from the sensor net server SS, and transmits the analysis result of the organization dynamics data to the client CL. Specifically, the transmit/receive unit ASSR receives the analysis request transmitted from the client CL, and transmits an acquisition request for the necessary organization dynamics data to the sensor net server SS. Further, the transmit/receive unit ASSR receives the organization dynamics data from the sensor net server SS, and transmits the analysis result by the analysis application to the client CL.

The storage unit ASME is configured by a hard disk, a memory, or an external storage device (for example, SD card). The storage unit ASME stores a setting condition of analysis by the analysis application, and the analysis result by the analysis application therein. Specifically, the storage unit ASME stores a user/location information table I, an organization information table H, a questionnaire G, an analysis result table F, an analysis condition period table E, and an analysis algorithm D therein.

The individual information such as a name, a job position, and a user ID of the user, and information on a place are registered in the user/location information table I.

Data (productivity of the organization and the error incidence ratio within the organization) necessary for modeling the organization, and data (climate information, stock quotation, etc.) necessary for conducting organization activity are registered in an organization information table H as generation information.

The performances (questionnaire result) related to the individual which is input by the wearer, and questions (questionnaire) of the performances related to the individual are registered in the questionnaire G.

The analysis result (organization dynamics index) of the organization dynamics data, and the analysis result of the performances related to the individual are registered in the analysis result table F.

The analysis condition for analyzing the organization dynamics data, and a period during which the organization dynamics data is analyzed are temporarily registered in the analysis condition period table E.

A program used for analysis of the organization dynamics data is stored in the analysis algorithm D. The application server AS executes the analysis processing by selecting an appropriate program in response to the analysis request from the client CL, and allowing the control unit ASCO to execute the selected program.

The control unit ASCO includes a central processing unit (CPU) (not shown), and executes control of the transmission and reception of the data, and the analysis processing of the organization dynamics data. Specifically, the CPU executes the program stored in the storage unit ASME to function as a communication control ASCC and a modelization analysis CA.

The communication control ASCC controls a timing of the communication between the sensor net server SS and the client CL in the wired or wireless manner. Further, the communication control ASCC converts a data format between a data format used in the communication between the client CL and the sensor net server SS, and a data format used within the control unit ASCO, and distributes the received data to the processing units corresponding to the type of the received data.

The modelization analysis unit CA models a main factor of difficulties associated with the organization on the basis of the organization dynamics data and the questionnaire result. The modelization analysis unit CA includes an face-to-face table creation unit C1A, a body rhythm table creation unit C1B, a face-to-face matrix creation unit C1C, a network index extraction unit CAA, a body rhythm index extraction unit CAB, a face-to-face index extraction unit CAC, an organization activity index extraction unit CAD, a correlation analysis unit CAE, a factor selection unit CAF, a personality index extraction analysis unit CA1, and a personality index conversion analysis unit CA2.

The face-to-face table creation unit C1A executes processing of rearranging the organization dynamics data in a time-series order for each wearer, and creating a face-to-face table indicative of which wearer the subject wearer faces for each wearer.

The body rhythm table creation unit C1B executes processing of rearranging the organization dynamics data in the time-series order for each wearer, and creating a body rhythm table indicative of a body rhythm of the wearer.

The face-to-face matrix creation unit C1C creates a table in which the facing of the respective wearers is combobulated in a matrix for each wearer, on the basis of the table created by the face-to-face table creation unit C1A.

The network index extraction unit CAA analyzes an index related to the network in the organization dynamics index which is an analysis result of the organization dynamics data according to the face-to-face table created by the face-to-face table creation unit C1A.

The body rhythm index extraction unit CAB analyzes an index related to the body rhythm in the organization dynamics index according to the body rhythm table crated by the body rhythm table creation unit C1B.

The face-to-face index extraction unit CAC analyzes an index related to the facing in the organization dynamics index according to the face-to-face table and the body rhythm table.

The organization activity index extraction unit CAD analyzes an index related to the organization in the organization dynamics index according to the face-to-face table and the body rhythm table.

The correlation analysis unit CAE executes analysis processing for obtaining a correlation between the organization dynamics index and the questionnaire result.

The factor selection unit CAF is processing for selecting a useful factor as a result of the analysis by the correlation analysis unit CAE.

The personality index extraction analysis unit CA1 and the personality index conversion analysis unit CA2 are processing for obtaining a personality index with the use of the organization dynamics data without the use of the performances related to the individual which is subjective data input by the wearer.

The personality index extraction analysis unit CA1 calculates a contribution coefficient of the organization dynamics index for the respective questionnaire items of the performances related to the individual. The calculation processing for the contribution coefficient is executed by a personality index coefficient extraction unit CA1A provided in the personality index extraction analysis unit CA1.

The personality index conversion analysis unit CA2 calculates an index which is a substitute for the performances related to the individual on the basis of the organization dynamics index, and the contribution coefficient calculated by the personality index extraction analysis unit CA1. The calculation processing of the index in question is executed by a personality index conversion unit CA2A provided in the personality index conversion analysis unit CA2.

The modelization analysis unit CA stores the analysis result of the organization dynamics in the analysis result table F, or transmits the analysis result of the organization dynamics from the transmit/receive unit ASSR to the client CL.

Figure 1F:
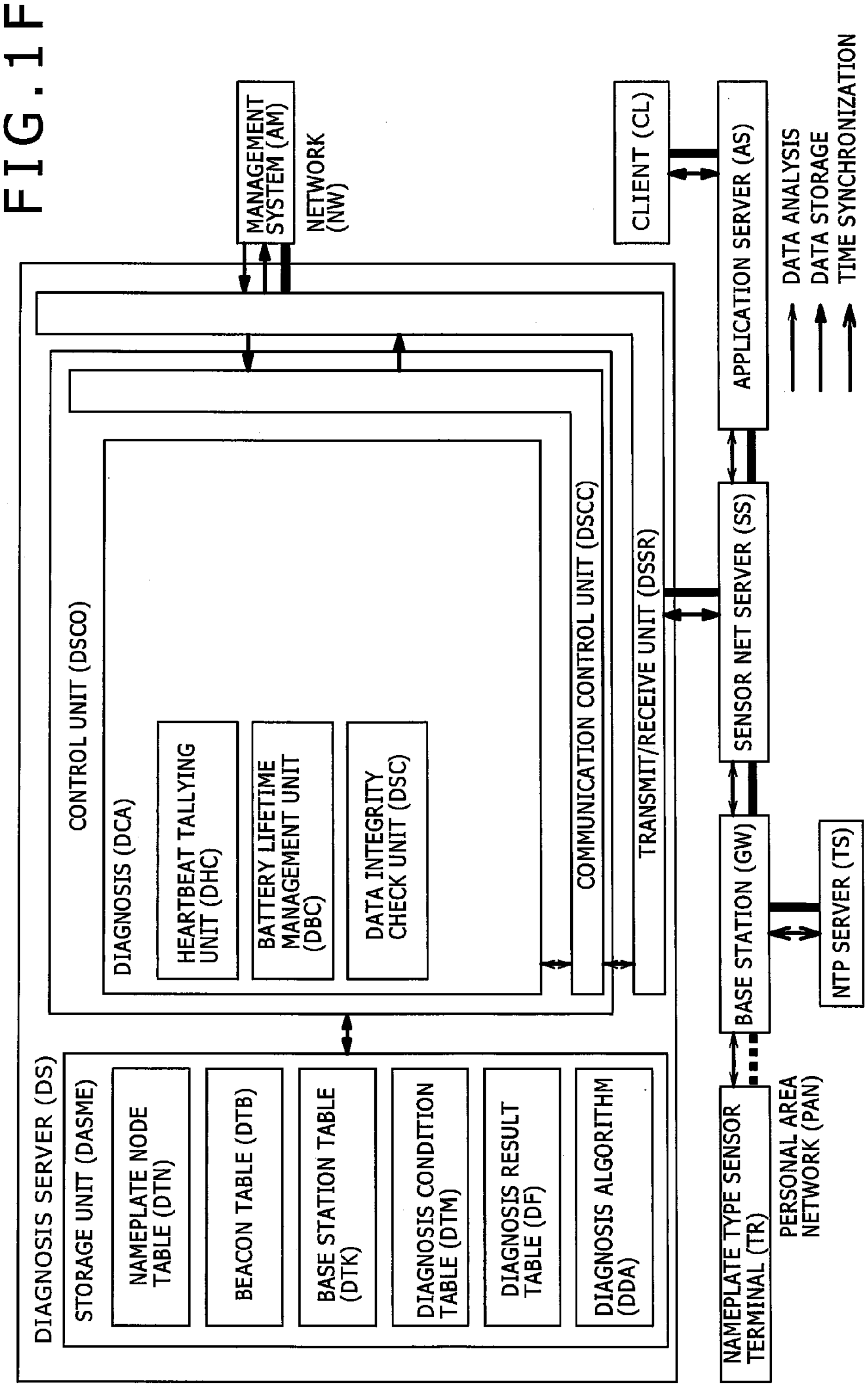
FIG. 1F is an illustrative view of a configuration of a diagnosis server according to the embodiment of the present invention.

FIG. 1F is an illustrative view of a configuration of the diagnosis server DS according to the embodiment of the present invention.

The diagnosis server DS diagnoses whether the system of the business microscope normally operates, or not. When receiving a diagnosis request from the management system AM, or when arriving at the set time, the diagnosis server DS starts a diagnosis application. The diagnosis application functions as a diagnosis unit DCA.

The diagnosis application acquires the data from the sensor net server SS, and allows a data integrity check unit DSC to determine whether an abnormality is present in the acquired data, or not.

Also, the diagnosis application allows a heartbeat tallying unit DHC to acquire information related to a communication by heartbeat between the nameplate type sensor terminals TR and the base station GW, which is stored in the sensor net server SS. The heartbeat tallying unit DHC specifies the nameplate type sensor terminals TR and the base station GW which do not conduct the communication by the heartbeat for a given period, on the basis of the acquired information related to the communication by the heartbeat.

When the area beacon operates by a battery, a battery lifetime management unit DBC manages a battery lifetime of the area beacon.

The diagnosis server DS may transmit the diagnosis result by the diagnosis unit DCA to the management system AM, or may store the diagnosis result in a diagnosis result table DF. When receiving the diagnosis result, the management system AM displays the received diagnosis result.

The diagnosis application is stored in a diagnosis algorithm DDA, and executed by a control unit DSCO.

The diagnosis server DS includes a transmit/receive unit DSSR, a storage unit DSME, and the control unit DSCO.

The transmit/receive unit DSSR transmits and receives the diagnosis result between the sensor net server SS and the management system AM. Specifically, the transmit/receive unit DSSR receives the diagnosis request transmitted by the management system AM, and transmits the acquisition request for the organization dynamics data used in the diagnosis to the sensor net server SS. Also, the transmit/receive unit DSSR receives the organization dynamics data from the sensor net server SS, and transmits the diagnosis result diagnosed with the use of the received organization dynamics data to the management system AM.

The storage unit DSME is configured by a hard disk, a memory, or an external storage device (for example, SD card). The storage unit DSME stores a setting condition of the diagnosis by the diagnosis application, and the diagnosis result by the diagnosis application therein. Specifically, the storage unit DSME includes a nameplate terminal table DTN, a beacon table DTB, a base station table DTK, a diagnosis condition period table DTM, a diagnosis result table DF, and the diagnosis algorithm DDA therein.

Information related to the nameplate type sensor terminal TR to be diagnosed is registered in the nameplate terminal table DTN, information related to the area beacon to be diagnosed is registered in the beacon table DTB, and information related to the base station GW to be diagnosed is registered in a base station table DTC.

A condition of the diagnosis by the diagnosis application, and a period during which the diagnosis application is diagnosed are registered in the diagnosis condition period table DTM.

The diagnosis result by the diagnosis application is registered in the diagnosis result table DF.

A program used in diagnosis of the business microscope system is stored in the diagnosis algorithm DDA. The diagnosis server DS selects an appropriate program in response to the diagnosis request from the management system AM, and allows the selected control unit DSCO to execute the appropriate program, to thereby execute the diagnosis processing.

The control unit DSCO includes a central processing unit (CPU) (not shown), and executes the control of transmit and reception of the data and the diagnosis processing of the business microscope system. Specifically, a CPU (not shown) executes the program stored in the storage unit DSME, to thereby function as a communication control unit DSCC, the heartbeat tallying unit DHC, the battery lifetime management unit DBC, and the data integrity check unit DSC.

The communication control unit DSCC controls a timing of the communication between the sensor net server SS and the management system AM in the wired or wireless manner. Further, the communication control unit DSCC converts a data format between a data format used in the communication between the sensor net server SS and the management system AM, and a data format used within the control unit DSCO, and distributes the received data to the processing units corresponding to the type of the received data.

The diagnosis server DS may store the diagnosis result by the diagnosis unit DCA in the diagnosis result table DF, or may transmit the diagnosis result by the diagnosis unit DCA from the transmit/receive unit DSSR to the management system AM.

Figure 1G:
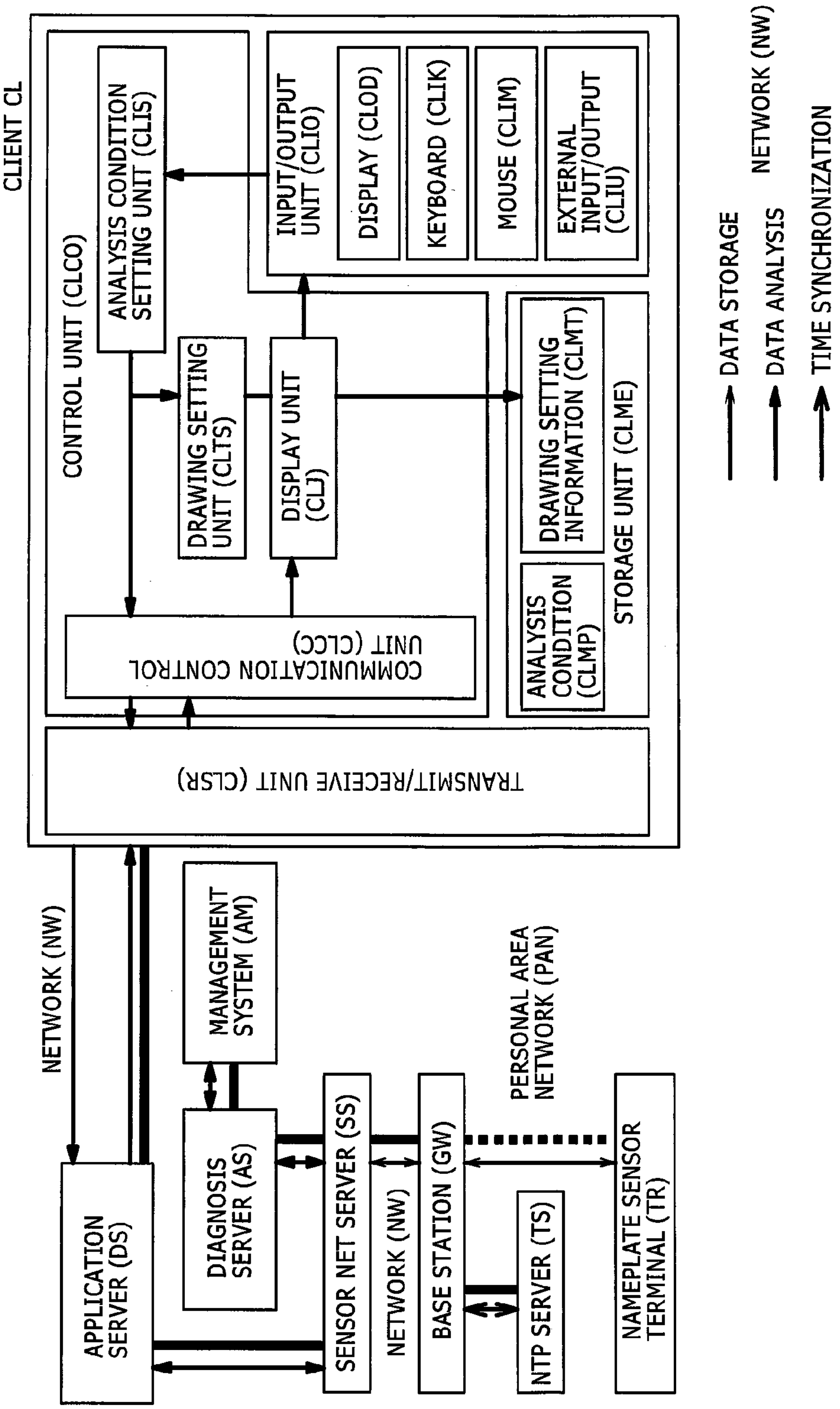
FIG. 1G is an illustrative view of a configuration of a client according to the embodiment of the present invention.

FIG. 1G is an illustrative view of the configuration of the client CL according to the embodiment of the present invention.

The client CL is a contact between the business microscope system and a system manager, and displays the analysis result of the organization dynamics data.

The client CL includes an input/output unit CLIO, a transmit/receive unit CLSR, a storage unit CLME, and a control unit CLCO.

The input/output unit CLIO configures an interface with the system manager. The input/output unit CLIO includes a display CLOD, a keyboard CLIK, a mouse CLIM, and an external input/output CLIU. The external input/output CLIU can be connected with another input/output device as needed.

The display CLOD is an image display device such as a CRT (cathode-ray tube) or a liquid crystal display. The display CLOD may include a printer.

The transmit/receive unit CLSR transmits and receives the data with respect to the application server AS. Specifically, the transmit/receive unit CLSR transmits an analysis request for the organization dynamics data to the application server AS, and receives the analysis result of the organization dynamics data from the application server AS.

The storage unit CLME is configured by a hard disk, a memory, or an external storage device (for example, SD card). The storage unit CLME records information necessary for rendering the analysis result such as analysis conditions CLMP and rendering setting information CLMT therein.

Conditions such as the number of members to be analyzed and the selection of the analysis methods, which are set by the system manager, are registered in the analysis conditions CLMP. Information related to the rendering position of the display CLOD is recorded in the rendering setting information CLMT. Further, a program to be executed by a CPU (not shown) of the control unit CLCO may be stored in the storage unit CLME.

The control unit CLCO includes a CPU (not shown), and executes control processing of a communication with the application server AS, reception processing of an input of the analysis conditions from the system manager, and rendering processing for providing the analysis result to the system manager. Specifically, the CPU executes a program stored in the storage unit CLME, to thereby function as a communication control unit CLCC, an analysis condition setting unit CLIS, a rendering setting unit CLTS, and a display unit CLJ.

The communication control unit CLCC controls a timing of the communication with respect to the application server AS. Also, the communication control unit DSCC converts a data format between a data format used in the communication with the application server AS, and a data format used within the control unit CLCO, and distributes the received data to the processing units corresponding to the type of the received data.

The analysis condition setting unit CLIS receives the analysis conditions input by the system manager through the input/output unit CLIO, and stores the received analysis conditions in the analysis conditions CLMP of the storage unit CLME. The analysis conditions are to be analyzed in a period of the organization dynamics data to be analyzed, and include the type of analysis, and a parameter for the analysis. The client CL transmits the analysis request including the analysis conditions input through the input/output unit CLIO to the application server AS, and also executes the rendering setting processing by the rendering setting unit CLTS.

The rendering setting unit CLTS calculates a method for displaying the analysis result based on the analysis conditions CLMP, and positions for plotting a drawing indicative of the analysis result. The results of the rendering setting processing by the rendering setting unit CLTS are registered in the rendering setting information CLMT of the storage unit CLME.

The display unit CLJ generates a display screen of the analysis result received from the application server AS on the basis of the information registered in the rendering setting information CLMT.

Figure 1H:
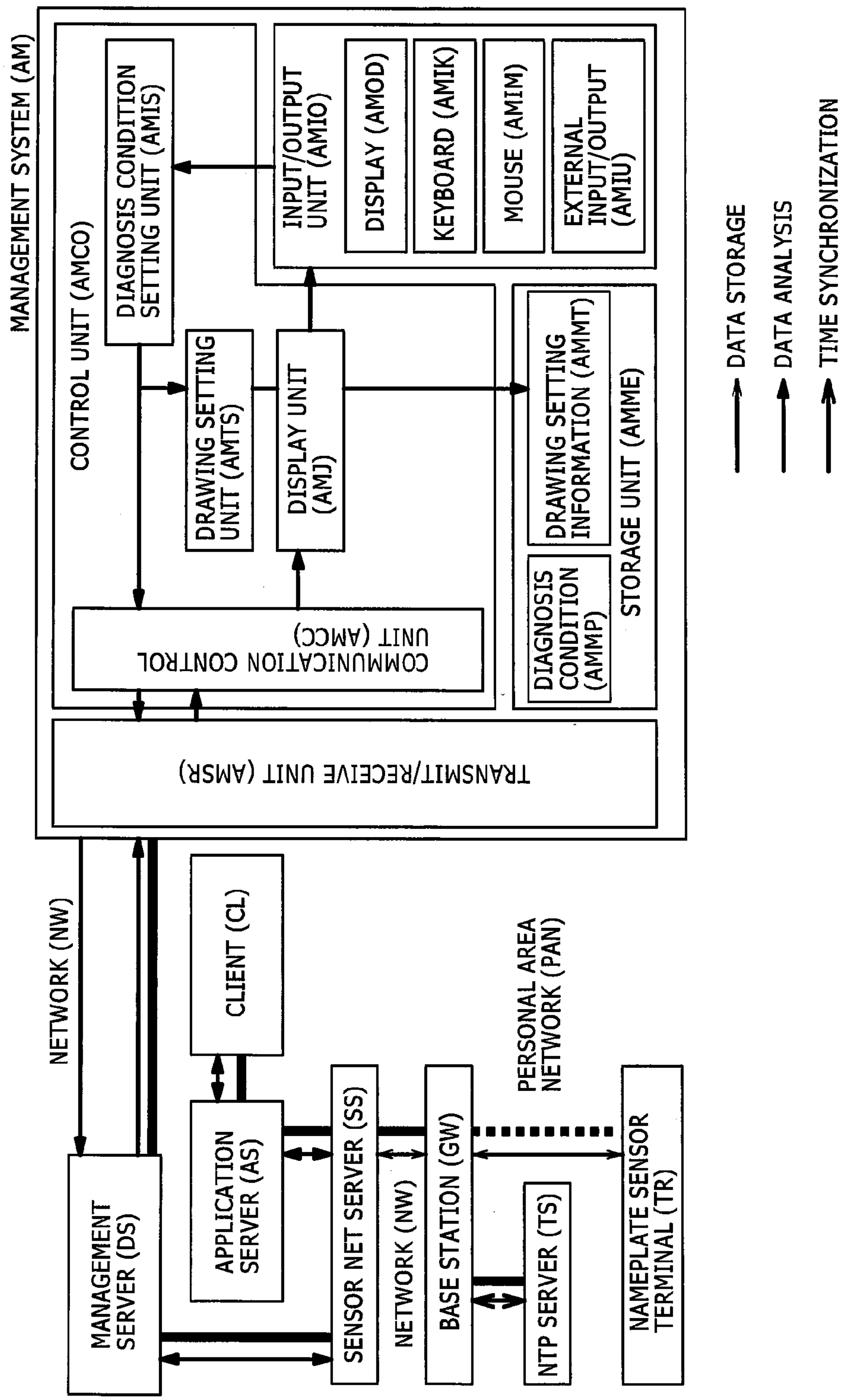
FIG. 1H is an illustrative view of a configuration of a management system according to the embodiment of the present invention.

FIG. 1H is an illustrative view of a configuration of the management system AM according to the embodiment of the present invention.

The management system AM is a contact between the business microscope system and a system manager, and displays the analysis result of the business microscope system.

The management system AM includes an input/output unit AMIO, a transmit/receive unit AMSR, a storage unit AMME, and a control unit AMCO.

The input/output unit AMIO configures an interface with the system manager. The input/output unit AMIO includes a display AMOD, a keyboard AMIK, a mouse AMIM, and an external input/output AMIU. The external input/output AMIU can be connected with another input/output device as needed.

The display AMOD is an image display device such as a CRT (cathode-ray tube) or a liquid crystal display. The display AMOD may include a printer.

The transmit/receive unit AMSR transmits and receives the data with respect to the diagnosis server DS. Specifically, the transmit/receive unit AMSR transmits a diagnosis request to the diagnosis server DS, and receives the diagnosis result from the diagnosis server DS.

The storage unit AMME is configured by a hard disk, a memory, or an external storage device (for example, SD card). The storage unit AMME records information necessary for rendering the diagnosis result such as diagnosis conditions AMMP and rendering setting information AMMT therein.

Conditions such as a diagnosis target set by the system manager, and the selection of the diagnosis methods are registered in the analysis conditions AMMP. Information related to the rendering position in which what is plotted in a portion of a drawing terminal is recorded in the rendering setting information AMT. Further, a program to be executed by a CPU (not shown) of the control unit AMCO may be stored in the storage unit AMME.

The control unit AMCO includes a CPU (not shown), and executes control processing of a communication with the diagnosis server DS, reception processing of an input of the diagnosis conditions from the system manager, and rendering processing for providing the diagnosis result to the system manager. Specifically, the CPU executes a program stored in the storage unit AMME, to thereby function as a communication control unit AMCC, a diagnosis condition setting unit AMIS, a rendering setting unit AMTS, and a display unit AMJ.

The communication control unit AMCC controls a timing of the communication with respect to the diagnosis server DS. Also, the communication control unit AMCC converts a data format between a data format used in the communication with the diagnosis server DS, and a data format used within the control unit AMCO, and distributes the received data to the processing units corresponding to the type of the received data.

The diagnosis condition setting unit AMIS receives the diagnosis conditions input by the system manager through the input/output unit AMIO, and stores the received diagnosis conditions in the diagnosis conditions AMMP of the storage unit AMME. The diagnosis conditions include a device to be diagnosed, the type of diagnosis, and a parameter for diagnosis. The management system AM transmits the analysis request including the diagnosis conditions input through the input/output unit AMIO to the diagnosis server DS, and also executes the rendering setting processing by the rendering setting unit AMTS.

The rendering setting unit AMTS calculates a method for displaying the diagnosis result based on the diagnosis conditions AMMP, and positions for plotting a drawing indicative of the diagnosis result. The results of the rendering setting processing by the rendering setting unit AMTS are registered in the rendering setting information AMMT of the storage unit AMME.

The display unit AMJ generates a display screen of the diagnosis result received from the diagnosis server DS on the basis of the information registered in the rendering setting information AMMT.

<Description of Nameplate Type Sensor Terminals TR>

Subsequently, an appearance of the nameplate type sensor terminal TR according to the embodiment of the present invention will be described with reference to FIGS. 2A to 2F.

Referring to FIGS. 2A to 2F, the nameplate type sensor terminal TR having the display device LCDD will be described. When the display device LCDD is oriented toward the wearer side, information for the wearer of organization activity feedback data indicative of the number of facing persons, a present time, and the number of steps of the wearer is displayed on the display device LCDD. On the other hand, when the display device LCDD is not oriented toward the wearer side, other information for the wearer such as the affiliation and the name of the wearer is displayed on the display device LCDD.

In this example, as illustrated in FIG. 2A, the nameplate type sensor terminal TR includes attaching portions NSH1 to NSH3 for attaching a strap or the like used when the wearer wears the nameplate type sensor terminal TR. One surface on which the attaching portions NSH1 to NSH3 are provided is defined as an upper surface, and another surface opposing the one surface is defined as a lower surface. The functions of the attaching portions NSH1 to NSH3 will be described in detail with reference to FIGS. 5A to 5C.

Also, one surface that is oriented toward the wearer side when the wearer wears the nameplate type sensor terminal TR is defined as a back surface, and another surface opposing the one surface is defined as a front surface.

Further, a surface located on a left side of the front surface of the nameplate type sensor terminal TR is defined as a left surface, and a surface opposing the left surface is defined as a right surface.

FIG. 2A is a top view of the nameplate type sensor terminal TR according to the embodiment of the present invention.

The top surface of the nameplate type sensor terminal TR is formed with the three attaching portions NSH1 to NSH3. The attaching portions NSH1 to NSH3 are each configured by an opening portion penetrating from the upper surface of the nameplate type sensor terminal TR to the back surface (refer to FIG. 2F) into an L-shape. The wearer allows the strap to pass through each opening portion of the attaching portions NSH1 to NSH3, and wears the strap around his neck to wear the nameplate type sensor terminal TR.

The opening portions of the attaching portions NSH1 to NSH3 are not seen from the front surface of the nameplate type sensor terminal TR.

Also, in FIG. 2A, the nameplate type sensor terminal TR has three attaching portions. However, the number of attaching portions is not limited to three, but may include at least one attaching portion.

FIG. 2B is a front view of the nameplate type sensor terminal TR according to the embodiment of the present invention.

An LED lamp LED1, a microphone MIC, the infrared transceivers TRIR1 to TRIR4, the area beacon reception unit ABR, and the illuminance sensor LS1F are arranged in the front surface of the nameplate type sensor terminal TR.

The LED lamp LED1 notifies a wearer and a person facing the wearer of a state of the nameplate type sensor terminal TR. For example, the LED lamp LED1 emits a light in red, for example, when an abnormality occurs in the nameplate type sensor terminal TR.

The microphone MIC acquires a speech of the wearer having the nameplate type sensor terminal TR, and an ambient sound. The illumination sensor LS1F and the illumination sensor LS1B arranged on the rear surface side illustrated in FIG. 2F detect illuminance information necessary to determine whether the nameplate type sensor terminal TR is oriented toward the wearer side, or not. The area beacon reception unit ABR receives the infrared rays transmitted from an area beacon not shown.

The nameplate type sensor terminal TR includes a plurality of infrared transceivers. FIG. 2B illustrates an example in which the nameplate type sensor terminal TR has six infrared transceivers TRIR1 to TRIR6.

The four infrared transceivers TRIR1 to TRIR4 are arranged on the front surface of the nameplate type sensor terminal TR so that an infrared emitting diode equipped in each of the infrared transceivers TRIR1 to TRIR4 emits the infrared rays outward from the front surface side of the nameplate type sensor terminal TR, and an infrared ray phototransistor equipped in each of the infrared transceivers TRIR1 to TRIR4 receives the infrared rays input from the front surface side of the nameplate type sensor terminal TR.

The infrared transceivers TRIR1 to TRIR4 are arranged with an alteration of the respective angles for the purpose of enlarging a transmit range of the infrared rays and a receive range of the infrared rays.

An opening portion IRW that transmits the infrared rays is formed in the housing of the nameplate type sensor terminal TR, and the infrared transceivers TRIR1 to TRIR4 transmit and receive the infrared rays through the opening portion IRW with respect to another nameplate type sensor terminal TR.

The opening portion IRW may be formed by an actual opening, or a member that transmits the infrared rays may be fitted to the opening portion IRW.

When the overall housing of the nameplate type sensor terminal TR is formed of a member that transmits the infrared rays, the opening portion IRW may not be formed in the housing.

Two of the infrared transceivers TRIR5 and TRIR6 are arranged on the left surface and the right surface.

The infrared transceiver TRIR5 is arranged on the left surface side of the nameplate type sensor terminal TR so that an infrared emitting diode equipped in the infrared transceiver TRIR5 emits the infrared rays outward from the left surface side of the nameplate type sensor terminal, and an infrared ray phototransistor equipped in the infrared transceiver TRIR5 receives the infrared rays input from the left surface side of the nameplate type sensor terminal TR.

Also, the infrared transceiver TRIR6 is arranged on the right surface side of the nameplate type sensor terminal TR so that an infrared emitting diode equipped in the infrared transceiver TRIR6 emits the infrared rays outward from the right surface side of the nameplate type sensor terminal, and an infrared ray phototransistor equipped in the infrared transceiver TRIR6 receives the infrared rays input from the right surface side of the nameplate type sensor terminal TR.

The infrared transceivers TRIR5 and TRIR6 are designed to, for example, detect the facing of the side surfaces of the wearer when a plurality of persons sees the same display screen, but not to detect the facing of another wearer who is merely located on any side surface of the wearer, and another wearer who works on an adjacent desk. For that reason, an output intensity of the infrared rays of the infrared emitting diodes of the infrared transceivers TRIR5 and TRIR6 is set to be lower than an output intensity of the infrared rays of the infrared emitting diodes of the infrared transceivers TRIR1 to TRIR4 arranged on the front surface of the nameplate type sensor terminal TR.

The feature of the present invention resides in the arrangement angles of the infrared transceivers TRIR1 to TRIR4, but this feature will be described in detail with reference to FIGS. 8 and 9.

The nameplate type sensor terminal TR can store when to face which nameplate type sensor terminals TR by allowing the infrared transceivers TRIR1 to TRIR6 to intermittently transmit the terminal information TRMT of the nameplate type sensor terminal TR by the infrared rays, and to receive the terminal information TRMT of the nameplate type sensor terminal TR worn by the facing wearer. With this configuration, the business microscope system can specify the face-to-face status of the respective wearers.

Figure 2C:
FIG. 2C is a bottom view of the nameplate type sensor terminal according to the embodiment of the present invention.

FIG. 2C is a bottom view of the nameplate type sensor terminal TR according to the embodiment of the present invention.

A power switch PSW and a cradle connector CRDIF are arranged on a lower surface of the nameplate type sensor terminal TR.

The power switch PSW is a switch that powers on/off the nameplate type sensor terminal TR. The cradle interface CRDIF is a connector for connecting the nameplate type sensor terminal TR to a cradle not shown.

Figure 2D:
FIG. 2D is a right side view of the nameplate type sensor terminal according to the embodiment of the present invention.

FIG. 2D is a right side view of the nameplate type sensor terminal TR according to the embodiment of the present invention.

The infrared transceiver TRIR6 emits the infrared rays from the right surface of the nameplate type sensor terminal TR, and receives the infrared rays from the right surface of the nameplate type sensor terminals TR.

Figure 2E:
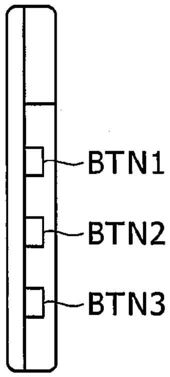
FIG. 2E is a left side view of the nameplate type sensor terminal according to the embodiment of the present invention.

FIG. 2E is a left side view of the nameplate type sensor terminal TR according to the embodiment of the present invention.

The infrared transceiver TRIR5 emits the infrared rays from the left surface of the nameplate type sensor terminal TR, and receives the infrared rays from the left surface of the nameplate type sensor terminals TR.

Three buttons BTN1 to BTN3 are arranged on the left surface of the nameplate type sensor terminal TR. The nameplate type sensor terminal TR stores when to operate which button as an operation history, and transmits the operation history to the base station GW. Also, the wearer operates any button to change an operation mode of the nameplate type sensor terminal TR, and switch the display of the display device LCDD to another.

Figure 2F:
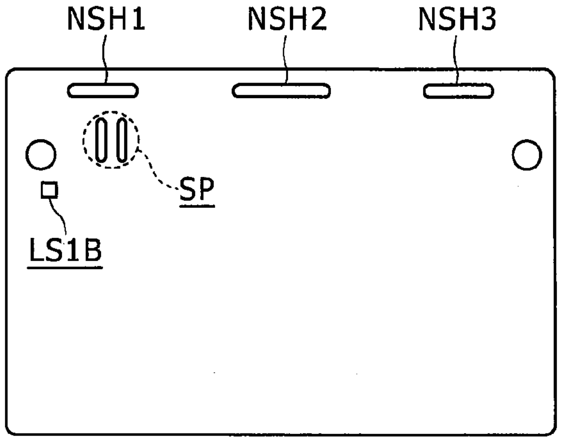
FIG. 2F is a rear view of the nameplate type sensor terminal according to the embodiment of the present invention.

FIG. 2F is a rear view of the nameplate type sensor terminal TR according to the embodiment of the present invention.

Openings of the attaching portions NSH1 to NSH3 is formed, and also the speaker SP and illumination sensor LS1B are arranged, in the rear surface of the nameplate type sensor terminal TR.

The speaker SP outputs an alarm tone from the speaker SP when it is determined that the nameplate type sensor terminals TR is worn inside out.

Various modifications are conceivable in the arrangement of components of the nameplate type sensor terminal TR. A first modification of the nameplate type sensor terminal TR will be described with reference to FIGS. 3A and 3B, and a second modification of the nameplate type sensor terminal TR will be described with reference to FIGS. 4A to 4D.

Figure 3A:
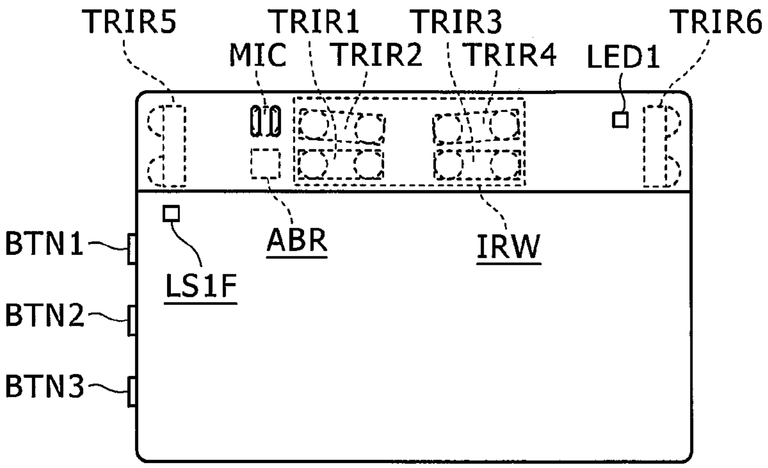
FIG. 3A is a front view of the nameplate type sensor terminal according to a first modification of the embodiment of the present invention.
Figure 3B:
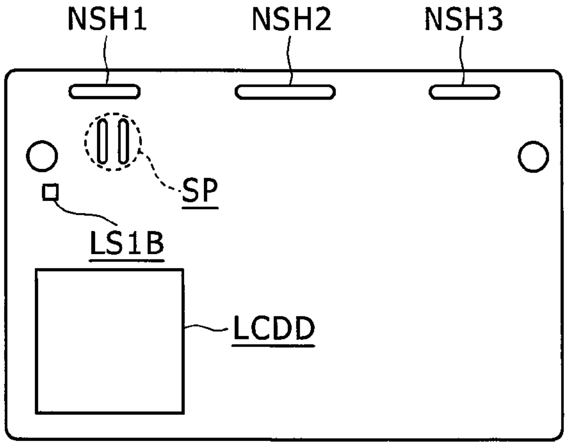
FIG. 3B is a rear view of the nameplate type sensor terminal according to the first modification of the embodiment of the present invention.

The first modification of the nameplate type sensor terminal TR is a modification in which the display device LCDD is arranged on the rear surface of the nameplate type sensor terminal TR. In FIGS. 3A and 3B, the same configurations as those of the nameplate type sensor terminal TR illustrated in FIGS. 2A to 2F are denoted by identical symbols, and their description will be omitted. Also, a top view, a bottom view, a right side view, and a left side view of the nameplate type sensor terminal TR according to the first modification are identical with FIGS. 2A, 2C, 2D, and 2E, respectively, and therefore will be omitted.

FIG. 3A is a front view of the nameplate type sensor terminal TR according to the first modification of the embodiment of the present invention. FIG. 3B is a rear view of the nameplate type sensor terminal TR according to the first modification of the embodiment of the present invention.

As illustrated in FIGS. 3A and 3B, the display device LCDD is not arranged on the front surface of the nameplate type sensor terminal TR, but the display device LCDD is arranged on the rear surface of the nameplate type sensor terminal TR.

Information for the wearer is exclusively disposed on the display device LCDD of the nameplate type sensor terminal TR according to the first modification.

The second modification of the nameplate type sensor terminal TR provides no display device LCDD, but specifies the detection and storage of the organization dynamics data by the various sensors and infrared communication. In FIGS. 4A to 4D, the same configurations as those of the nameplate type sensor terminal TR illustrated in FIGS. 2A to 2F are denoted by identical symbols, and their description will be omitted. Also, a top view and a right side view of the nameplate type sensor terminal TR according to the first modification are identical with FIGS. 2A and 2D, respectively, and therefore will be omitted.

Figure 4A:
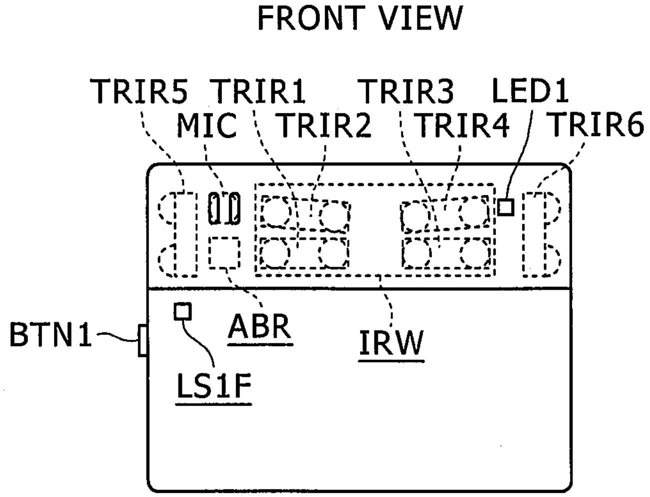
FIG. 4A is a front view of the nameplate type sensor terminal according to a second modification of the embodiment of the present invention.
Figure 4B:
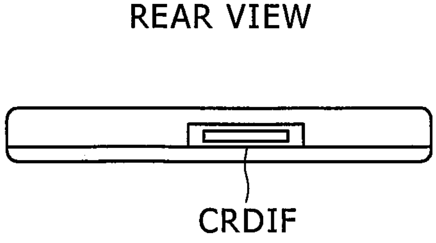
FIG. 4B is a bottom view of the nameplate type sensor terminal according to the second modification of the embodiment of the present invention.
Figure 4C:
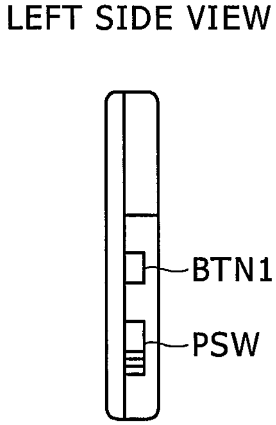
FIG. 4C is a left side view of the nameplate type sensor terminal according to the second modification of the embodiment of the present invention.
Figure 4D:
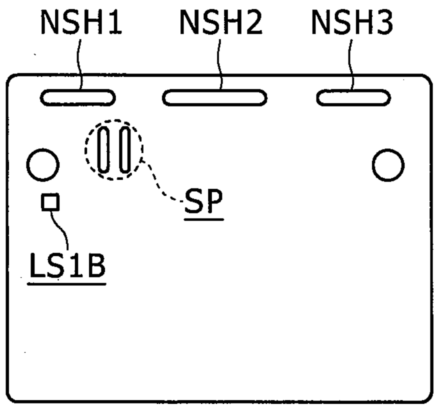
FIG. 4D is a rear view of the nameplate type sensor terminal according to the second modification of the embodiment of the present invention.

FIG. 4A is a front view of the nameplate type sensor terminal TR according to a second modification of the embodiment of the present invention. FIG. 4B is a bottom view of the nameplate type sensor terminal TR according to the second modification of the embodiment of the present invention. FIG. 4C is a left side view of the nameplate type sensor terminal TR according to the second modification of the embodiment of the present invention. FIG. 4D is a rear view of the nameplate type sensor terminal TR according to the second modification of the embodiment of the present invention.

As described above, the nameplate type sensor terminal TR of the second modification includes no display device LCDD. Also, as illustrated in FIG. 4C, the nameplate type sensor terminal TR has only one button BTN1. With this configuration, the nameplate type sensor terminal TR can be reduced in size.

Further, in the nameplate type sensor terminals TR illustrated in FIGS. 2A to 2F, 3A, and 3B, the power switch PSW is arranged on the lower surface. On the other hand, in the nameplate type sensor terminal TR according to the second modification, the power switch is arranged on the left surface.

Subsequently, a method for wearing the nameplate type sensor terminal TR will be described with reference to FIGS. 5A to 5C.

Figure 5A:
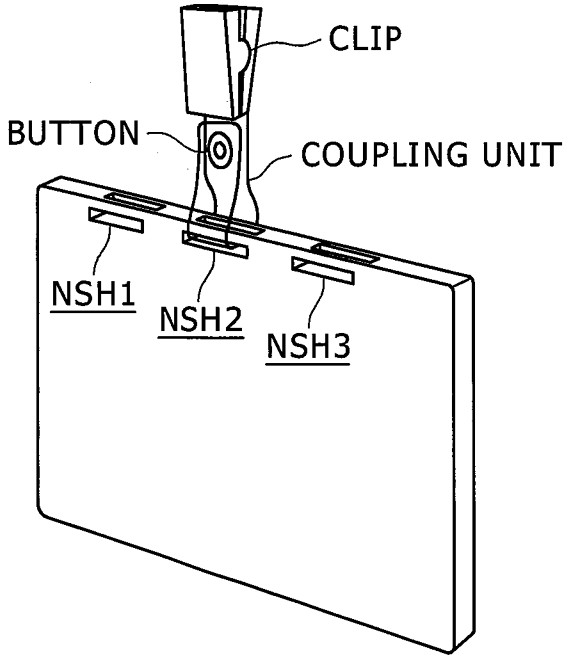
FIG. 5A is an illustrative view of a method for wearing the nameplate type sensor terminal by the aid of a clip according to the embodiment of the present invention.

FIG. 5A is an illustrative view of a method for wearing the nameplate type sensor terminal TR by the aid of a clip according to the embodiment of the present invention.

The clip has a coupling unit of a string. A button is disposed on both ends of the coupling unit. The button is fastened in a state where the coupling unit passes through the attaching portion NSH2 in the center of the upper surface of the nameplate type sensor terminal TR from the upper surface side to the rear surface side, to thereby couple the clip to the nameplate type sensor terminal TR.

A clothing of the wearer is nipped by the clip to wear the nameplate type sensor terminal TR.

Figure 5B:
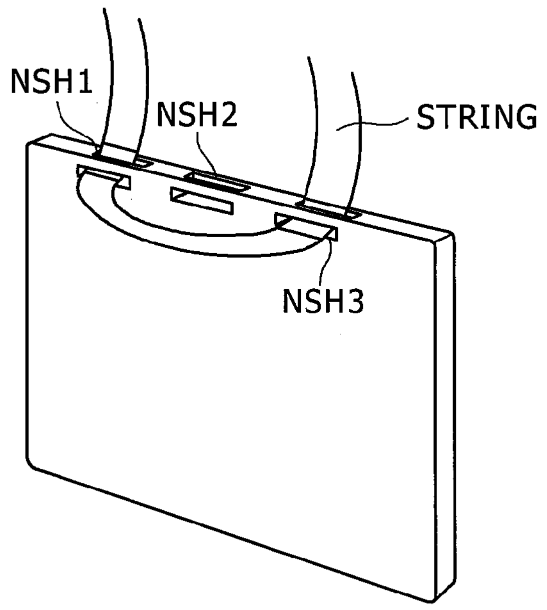
FIG. 5B is an illustrative view of a method for wearing the nameplate type sensor terminal by the aid of a string according to the embodiment of the present invention.

FIG. 5B is an illustrative view of a method for wearing the nameplate type sensor terminal TR by the aid of a string according to the embodiment of the present invention.

The string passes through the attaching portions NSH1 and NSH3 on both sides of the upper surface of the nameplate type sensor terminal TR, and the string is looped to couple the string with the nameplate type sensor terminal TR. Then, the string coupled with the nameplate type sensor terminal TR is dangled around the neck of the wearer to wear the nameplate type sensor terminal TR.

Figure 5C:
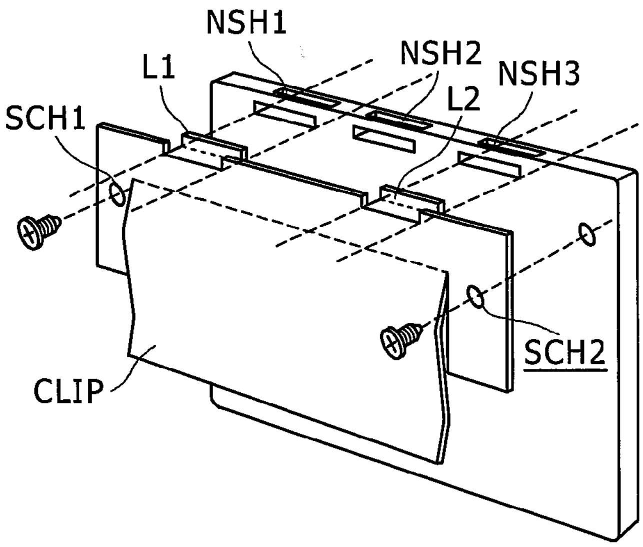
FIG. 5C is an illustrative view of a method for wearing the nameplate type sensor terminal by the aid of a clip exclusively for the nameplate type sensor terminal according to the embodiment of the present invention.

FIG. 5C is an illustrative view of a method for wearing the nameplate type sensor terminal TR by the aid of a clip exclusively for the nameplate type sensor terminal TR according to the embodiment of the present invention.

A dedicated plate-like clip is firmly fixed to the rear surface of the nameplate type sensor terminal TR with screws. Specifically, two L-shaped portions L1 and L2 formed in an upper end of the clip are inserted into the attaching portions NSH1 and NSH3 in the rear surface of the nameplate type sensor terminals TR. Then, the clip is firmly fixed to the rear surface of the nameplate type sensor terminal TR through two screw holes SCH1 and SCH2 formed in the clip with screws.

Because the clip is made of an elastic material, a breast packet or a collar of the wearer is nipped between the clip and the rear surface of the nameplate type sensor terminal TR to wear the nameplate type sensor terminal TR.

With the above configuration, the nameplate type sensor terminal TR can be worn by the person as with general nameplates, and various physical quantities of the wearer can be acquired by the sensor without giving the wearer a feeling of strangeness.

<Internal Configuration of Nameplate Type Sensor Terminal TR>

Subsequently, an internal structure of the nameplate type sensor terminal TR will be described with reference to FIG. 6.

Figure 6:
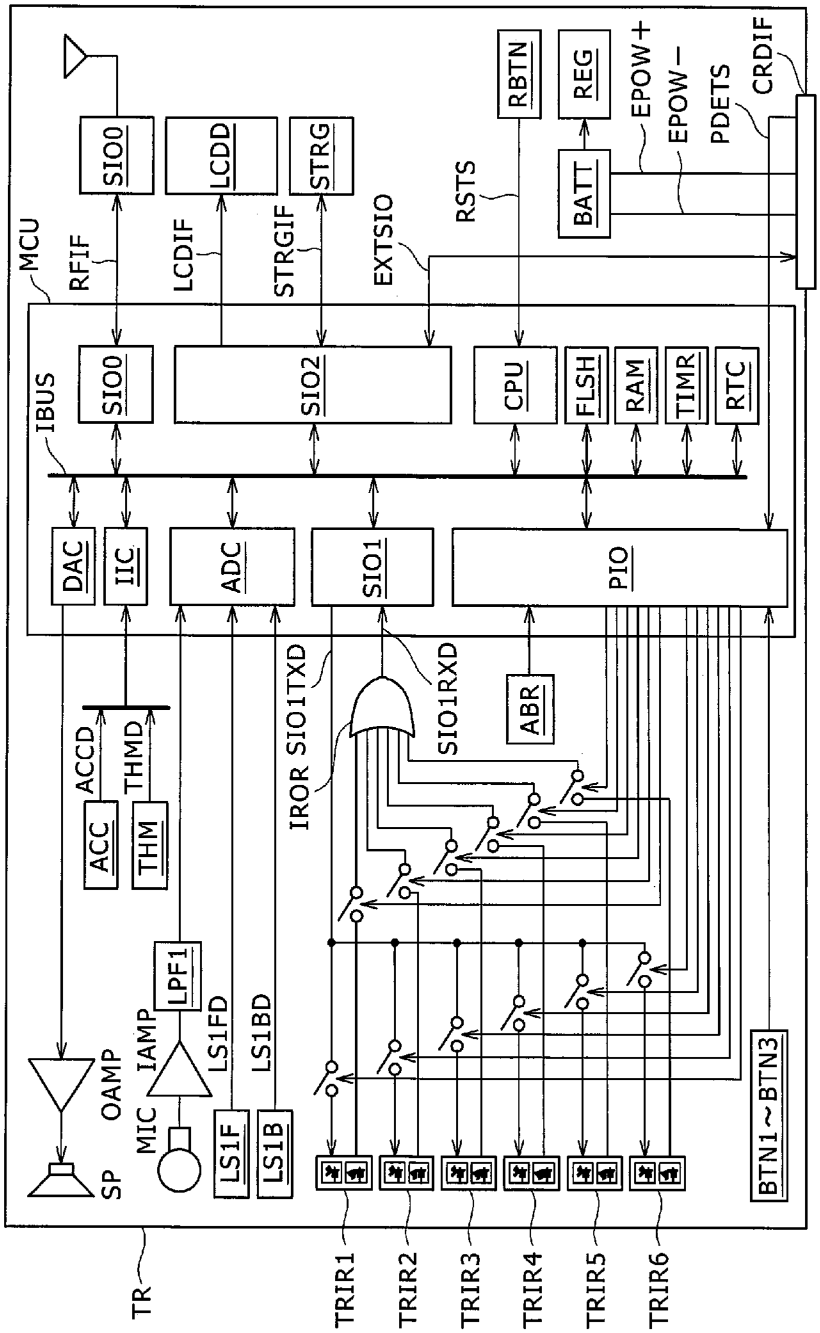
FIG. 6 is a hardware configuration diagram of a nameplate type sensor terminal according to the embodiment of the present invention.

FIG. 6 is a hardware configuration diagram of a nameplate type sensor terminal TR according to the embodiment of the present invention.

The nameplate type sensor terminals TR operates with a supply voltage obtained by stabilizing a voltage supplied by a built-in secondary battery BATT through a regulator REG. The nameplate type sensor terminal TR may operate with an external power supply through a cradle interface CRDIF connecting a cradle not shown.

The cradle is a device having a circuit for charging the secondary battery BATT incorporated into the nameplate type sensor terminal TR. The cradle may be formed of a cable, for example, if a supply voltage is applied from the external power, and a charger circuit for charging the secondary battery BATT of the nameplate type sensor terminal TR is provided. Alternatively, the cradle may be of a stationary type in which the nameplate type sensor terminal TR is placed to connect the cradle to the cradle interface CRDIF.

In the implementation where the nameplate type sensor terminal TR and the base station GW are communicated with each other in a wired manner, the cradle includes communication means with the base station GW, and the nameplate type sensor terminal TR communicates the data with the base station GW through the cradle interface CRDIF and the cradle.

The cradle interface CRDIF and the secondary battery BATT are connected to each other by two power lines EPOW+ and EPOW−. The power lines EPOW+ and EPOW− are cables for applying a supply voltage to the nameplate type sensor terminal TR from the external power supply, and also charging the secondary battery BATT applied from the external power supply.

When the cradle interface CRDIF is connected to the cradle, the cradle interface CRDIF inputs an external power detection signal PDETS to a general-purpose IO port PIO provided in the nameplate type sensor terminal TR. Therefore, the nameplate type sensor terminal TR can determine whether the nameplate type sensor terminal TR per se is connected to the external power supply, or not, according to the external power detection signal PDETS.

A microcomputer MCU controls the nameplate type sensor terminal TR. The microcomputer MCU is a large-scaled integrated circuit (LSI) in which various peripheral equipments are integrated through an internal bus IBUS, in addition to a central processing unit CPU. In general, the various peripheral equipments integrated in the microcomputer MCU include a serial interface, an A/D converter, a memory, a timer, and a general-purpose IO port. FIG. 6 illustrates an example of the microcomputer MCU in which three-channel serial interfaces SIO0, SIO1, SIO2, an A/D converter ADC, a D/A converter DAC, a timer TIMER, the general-purpose IO port PIO, a random access memory RAM, a flash memory FLSH, a real time clock RTC, and an IIC interface IIC are integrated together.

The A/D converter ADC converts data acquired by the microphone MIC as well as the illumination sensors LS1F and LS1B into a digital value. The nameplate type sensor terminal TR stores the information acquired by the various sensors, and facing information acquired by the infrared transceivers TRIR1 to TRIR6 into the storage unit STRG, and also transmits those pieces of information to the base station through the communication means.

In this example, the communication means may be implemented by a wireless communication circuit RF connected to the serial interfaces SIO0 through a wireless communication interface RFIF. Alternatively, the communication means may be implemented by an external serial port EXTSIO connected to the cradle interface CRDIF from the serial interface SIO2.

Also, the nameplate type sensor terminal TR analyzes the data acquired by the various sensors, and displays the analysis result on the display device LCDD. The display device LCDD is connected to the serial interface SIO2 through a display device interface LCDIF.

The microcomputer MCU acquires temperature data THMD acquired by a temperature sensor THM, and acceleration data acquired by the triaxial acceleration sensor AC through the IIC interface IIC.

The microphone MIC as well as the illumination sensors LS1F and LS1B are connected to the A/D converter ADC. A sound acquired by the microphone MIC is amplified to an appropriate output by an amplifier circuit IAMP, and processed by a Nyquist frequency for removing a folding caused by sampling through a filter LPF1, and thereafter acquired as digital data by the A/D converter ADC.

Sound data output from the D/A converter DAC and amplified by an amplifier OAMP is input to the speaker SP, and the speaker SP outputs the sound data.

The wireless communication circuit RF communicates with the microcomputer MCU through the wireless communication interface RFIF which is a serial bus. The buttons BTN1 to BTN3 are connected to the general-purpose IO port PIO.

A storage unit interface STRGIF from the serial interface SIO2 to the storage unit STRG, and an external serial port EXTSIOEXTSIO from the serial interface SIO2 to the cradle interface CRDIF are also serial buses.

The real time clock RTC manages accurate time information. The operation timing of the CPU is determined on the basis of the time information which is managed by the real time clock RTC.

A reset button RBTN is connected to the central processing unit CPU through a reset interface RSTS. The central processing unit CPU can be reset by depressing a reset button RBTN.

The infrared photo transistors of the infrared transceivers TRIR1 to TRIR6 are connected to the serial interface SIO1 through the OR circuit IROR. That is, when any infrared photo transistor receives the infrared data, the OR circuit IROR inputs the received infrared data to the serial interface SIO1 as a channel 1 serial receive signal SI01RxD. Also, the infrared emitting diodes of the infrared transceivers TRIR1 to TRIR6 are connected to the serial interface SIO1, and transmit the infrared data when receiving the channel 1 serial receive signal SIO1RxD from the serial interface SIO1.

The nameplate type sensor terminal TR according to this embodiment includes switches that can block the connections between the respective infrared emitting diodes of the infrared transceivers TRIR1 to TRIR6 and the serial interface SIO1, individually. The switches block the connections between the respective infrared emitting diodes and the serial interface SIO1, individually, to thereby invalidate the respective infrared emitting diodes, individually. The switches connect the respective infrared emitting diodes and the serial interface SIO1, to thereby validate the respective infrared emitting diodes, individually. For that reason, the switches function as a transmission unit switching unit that switches validity or invalidity of the infrared emitting diodes, individually.

Also, the nameplate type sensor terminal TR includes switches that can block the connections between the respective infrared photo transistors of the infrared transceivers TRIR1 to TRIR6 and the OR circuit IROR, individually. The switches block the connections between the respective infrared photo transistors and the OR circuit IROR, individually, to thereby invalidate the respective infrared photo transistors, individually. The switches connect the respective infrared photo transistor and the OR circuit IROR, to thereby validate the respective infrared photo transistors, individually. For that reason, the switches function as a transmission unit switching unit that switches validity or invalidity of the infrared photo transistors, individually.

Those switches enable the self-diagnosis of the respective infrared emitting diodes and the respective infrared photo transistors of the infrared transceivers TRIR1 to TRIR6. Specifically, the switches are set to connect one infrared emitting diode to be diagnosed to the serial interface SIO1, and the switches are also set to connect one infrared photo transistor to be diagnosed to the OR circuit IROR. That is, the infrared emitting diode and the infrared photo transistor, which are to be diagnosed, are validated. Then, the self-diagnosis is conducted according to whether the validated infrared photo transistor to be diagnosed can receive the infrared data transmitted from the validated infrared emitting diode to be diagnosed, or not.

This is repeated by all of the infrared emitting diodes and the infrared photo transistors. If no abnormality is present in the infrared emitting diodes and the infrared photo transistors, the infrared rays emitted by the validated infrared emitting diode can be received by the validated infrared photo transistor.

The number of infrared emitting diodes to be diagnosed, and the number of infrared photo transistors to be diagnosed are not limited to one, but may be plural.

Also, the general-purpose port is connected with the area beacon reception unit ABR that receives the infrared rays transmitted from the area beacon.

The infrared transceivers TRIR1 to TRIR6 communicate the infrared data high in directivity because a face-to-face communication of the respective wearers is detected. On the other hand, the area beacon reception unit ABR receives the infrared data in a range broader than that of the infrared transceivers TRIR1 to TRIR6. For that reason, the directivity of the infrared data transmitted by the area beacon is lower than the directivity of the infrared data transmitted by the infrared transceivers TRIR1 to TRIR6.

The area beacon reception unit ABR mainly receives the infrared data indicative of the ID of the area beacon installed in a conference room, to thereby detect that the wearer exists in the room where the area beacon is installed. Because the infrared communication between the area beacon and the area beacon reception unit ABR is broader in range than that of the infrared transceivers TRIR1 to TRIR6, the infrared rays modulated by 38 kHz is typically used.

<Description of Installation Angle of Infrared Transceivers TRIR1 to TRIR4>

A transmit/receive range of the infrared data by the nameplate type sensor terminal TR will be described with reference to FIGS. 7A to 7C.

Figure 7A:
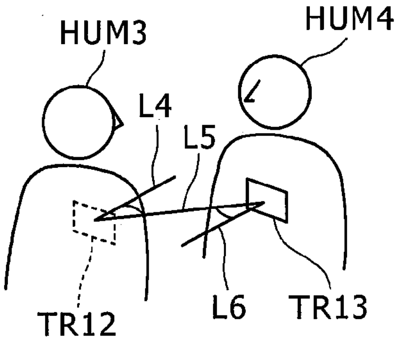
FIG. 7A is an illustrative view of a case in which wearers each having the nameplate type sensor terminal face each other to make a communication according to the embodiment of the present invention.

FIG. 7A is an illustrative view of a case in which wearers HUM3 and HUM3 having the respective nameplate type sensor terminals TR12 and TR13 face each other to make a communication according to the embodiment of the present invention.

When two persons talk with each other, it is rare that those two persons face each other completely in front, and the persons frequently face each other with a displacement of shoulder width degree. When the transmit/receive range of the infrared data of the infrared transceivers TRIR1 to TRIR4 of the nameplate type sensor terminal TR is oriented only in a direction perpendicular to the front surface of the nameplate type sensor terminal TR, the nameplate type sensor terminal TR cannot detect the facing of the wearers that face each other with the displacement of the shoulder width degree.

As illustrated in FIG. 7A, in general, a line L5 connecting a center of the front surface of the nameplate type sensor terminal TR12 worn by the wearer HUM3, and a center of the nameplate type sensor terminal TR13 worn by the wearer HUM4 falls within a range of about 30 degrees in a horizontal direction with respect to a perpendicular line L4 to the front surface of the nameplate type sensor terminal TR12, and a perpendicular line L5 to the front surface of the nameplate type sensor terminal TR13.

For that reason, the transmit/receive range of the infrared data of the infrared transceivers TRIR1 to TRIR4 in the nameplate type sensor terminal TR in the horizontal direction needs to be about 30 degrees.

The above-mentioned transmit/receive range is exemplary, and the transmit/receive range of the infrared transceivers TRIR1 to TRIR4 in the horizontal direction according to the present invention needs to only have some degree in the horizontal direction, and is not limited to 30 degrees.

Figure 7B:
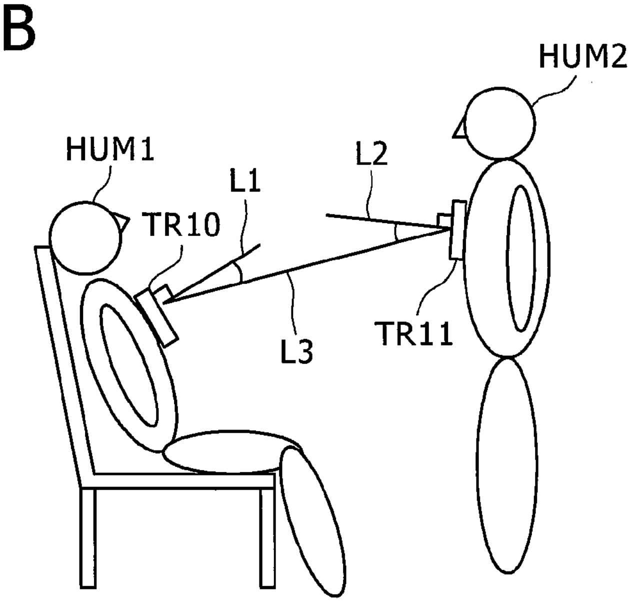
FIG. 7B is an illustrative view of a case in which a wearer who sits on a chair, and a wearer who stands make a communication according to the embodiment of the present invention.

FIG. 7B is an illustrative view of a case in which a wearer HUM1 who sits on a chair, and a wearer HUM2 who stands make a communication according to the embodiment of the present invention.

Since there is a difference between a height of a head of the person who sits, and a height of a head of the person who stands, an upper body of the person who sits on the chair is oriented slightly upward.

As illustrated in FIG. 7B, a line L3 connecting a center of the front surface of a nameplate type sensor terminal TRI0 worn by the wearer HUM1, and a center of a nameplate type sensor terminal TR11 worn by the wearer HUM2 is positioned lower than a perpendicular line L1 to the front surface of the nameplate type sensor terminal TRI0, and a perpendicular line L2 to the front surface of the nameplate type sensor terminal TR11.

Therefore, the transmit/receive range of the infrared data of the infrared transceivers TRIR1 to TRIR4 in the nameplate type sensor terminals TR in the vertical direction needs to extend from the front surface downward in the vertical direction.

Figure 7C:
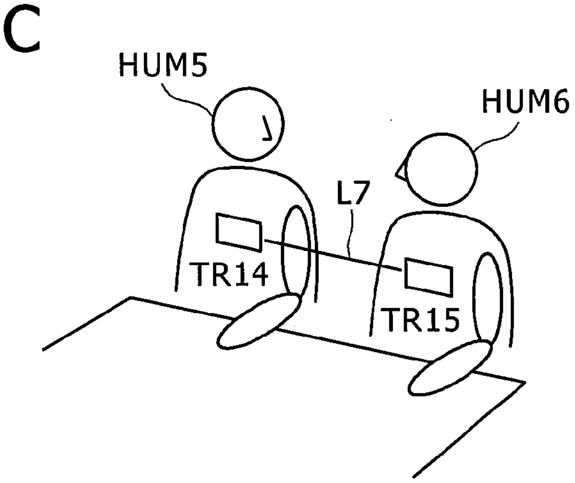
FIG. 7C is an illustrative view of a case in which wearers who sit at the same desk make a communication according to the embodiment of the present invention.

FIG. 7C is an illustrative view of a case in which wearers HUM5 and HUM6 who sit at the same desk make a communication according to the embodiment of the present invention.

A line L7 connecting a nameplate type sensor terminal TR14 worn by the wearer HUM5, and a nameplate type sensor terminal TR15 worn by the wearer HUM6 is a line connecting the right surface of the nameplate type sensor terminal TR14 and the left surface of the nameplate type sensor terminal TR15.

Therefore, in order to detect the facing of the wearers who sit at the same desk, the nameplate type sensor terminal TR needs to transmit and receive the infrared data also in a lateral direction. In this embodiment, the infrared transceivers TRIR5 and TRIR6 are arranged on the left surface and the right surface of the nameplate type sensor terminal, respectively.

In order to prevent false detection of the facing with the wearer who is oriented in the lateral direction of the wearer, and the wearer who works at the adjacent desk, an infrared output of the infrared emitting diodes of the infrared transceivers TRIR5 and TRIR6 arranged on the side surfaces of the nameplate type sensor terminal TR needs to be set to be lower than an infrared output of the infrared emitting diodes of the infrared transceivers TRIR1 to TRIR4.

Figure 8:
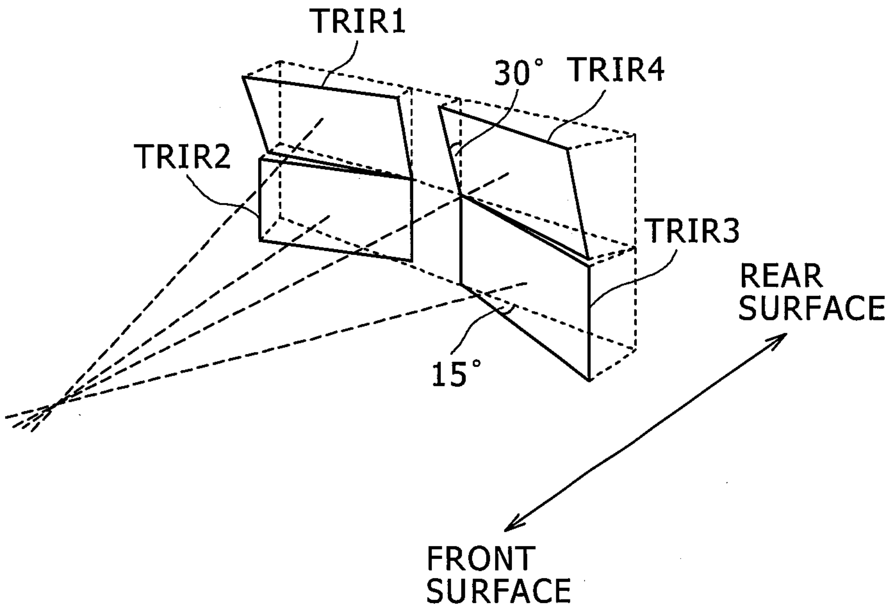
FIG. 8 is an illustrative view of an arrangement direction of the infrared transceivers according to the embodiment of the present invention.

FIG. 8 is an illustrative view of an arrangement direction of the infrared transceivers TRIR1 to TRIR4 according to the embodiment of the present invention.

The infrared transceivers TRIR1 to TRIR4 are arranged so that the infrared transceivers TRIR1 and TRIR2, and the infrared transceivers TRIR3 and TRIR4 are aligned in the horizontal direction, respectively.

In the infrared transceivers TRIR1 and TRIR2, the infrared transceiver TRIR1 is arranged above the infrared transceiver TRIR2, and in the infrared transceivers TRIR3 and TRIR4, the infrared transceiver TRIR4 is arranged above the infrared transceiver TRIR3.

The infrared transceivers TRIR1 to TRIR4 are arranged toward the inside of the front side of the nameplate type sensor terminal TR by 15 degrees.

In other words, the infrared transceivers TRIR1 to TRIR4 are arranged so that light emitting axes along which the infrared emitting diodes of the respective infrared transceivers emit the infrared rays, and light receiving axes along which the infrared photo transistors receive the infrared rays (hereinafter, the light emitting axes and the light receiving axes are collectively called "optical axes") approach each other toward the front side of the nameplate type sensor terminal TR.

The infrared transceivers TRIR1 to TRIR4 are arranged so that extensions of the optical axes of the infrared transceivers TRIR1 to TRIR4 approach each other toward the front side of the nameplate type sensor terminal TR even when the output intensity of the infrared rays is low.

Further, the infrared transceivers TRIR1 and TRIR4 arranged above the infrared transceivers TRIR2 and TRIR3 are arranged so that the light emitting axis along which the infrared emitting diode emits the infrared rays, and the light receiving axis along which the infrared photo transistor receives the infrared rays are oriented downward by 30 degrees.

Figure 9:
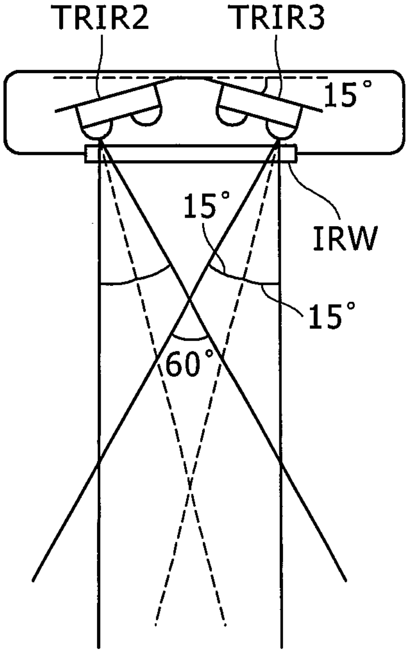
FIG. 9 is an illustrative view of a transmit/receive range of infrared rays of the infrared transceivers according to the embodiment of the present invention.

FIG. 9 is an illustrative view of a transmit/receive range of the infrared rays of the infrared transceiver TRIR1 to TRIR4 according to the embodiment of the present invention.

The infrared transceivers TRIR1 to TRIR4 are arranged as described in FIG. 8 whereby the infrared transceivers TRIR1 and TRIR2 which are located on the left side transmit the infrared data rightward from the front surface of the nameplate type sensor terminal TR, and also receives the infrared data in the right direction of the front surface of the nameplate type sensor terminal TR. Also, the infrared transceivers TRIR3 and TRIR4 which are located on the right side transmit the infrared data leftward from the front surface of the nameplate type sensor terminal TR, and also receives the infrared data in the left direction of the front surface of the nameplate type sensor terminal TR.

As illustrated in FIG. 9, when the nameplate type sensor terminal TR is viewed from above, the extensions of the optical axes of the infrared transceivers arranged in the horizontal direction cross each other. As illustrated in FIG. 9, when the sensitivities of the infrared transceivers TRIR2 and TRIR3 per se are ±15 degrees, because the arrangement angle of the infrared transceivers TRIR2 and TRIR3 to the housing are 15 degrees, the transmit/receive range of the infrared data in the infrared transceivers TRIR2 and TRIR3 in the horizontal direction is extended to 60 degrees.

With the above configuration, the nameplate type sensor terminal TR can also detect the facing of the respective wearers with a displacement of the shoulder width level as illustrated in FIG. 7A.

The present invention is not limited to the number of infrared transceivers, and the arrangement angle of the infrared transceiver as described above.

As described above, since the plurality of infrared transceivers TRIR1 to TRIR4 is arranged so that the respective axes approach each other, the opening portion IRW of the housing can be reduced, the nameplate type sensor terminal TR can be reduced in size, and the toughness of the housing can be improved.

<Description of Implementing Method for Infrared Transceivers TRIR1 to TRIR4>

Subsequently, a method for implementing the infrared transceivers TRIR1 to TRIR4 will be described with reference FIG. 10A or 11B.

Figure 10A:
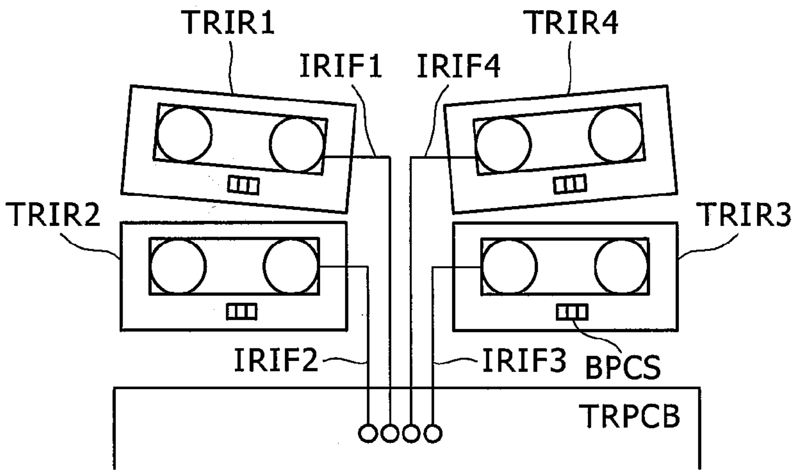
FIG. 10A is an illustrative view of the infrared transceivers implemented by a wire connection according to the embodiment of the present invention.

FIG. 10A is an illustrative view of the infrared transceivers TRIR1 to TRIR4 implemented by a wire connection according to the embodiment of the present invention.

A small-sized board on which the respective infrared transceivers TRIR1 to TRIR4 are mounted is connected to a main board TRPCB of the nameplate type sensor terminal TR by wires IRIF1 to IRIF4. The main board TRPCB is a board on which the microcomputer MCU is mounted.

The wires IRIF1 to IRIF4 are connected to the right side of the infrared transceivers TRIR1 and TRIR2 arranged on the left side, arranged on the left side of the infrared transceivers TRIR3 and TRIR4 arranged on the right side, aggregated between the infrared transceivers TRIR1 and TRIR2, and the infrared transceivers TRIR3 and TRIR4, and connected to the main board TRPCB. For that reason, a wiring length of the wires IRIF1 to IRIF4 can be shortened more than that when the wires IRIF1 to IRIF4 are connected to other positions of the infrared transceivers TRIR1 to TRIR4. With the above configuration, the housing of the nameplate type sensor terminal TR can be reduced in size. Also, since a wiring to the infrared emitting diode in which a large current flows can be also reduced in length, electromagnetic waves radiated from the wiring can be reduced, electric noise to the various sensors can be suppressed, and the performance of the sensor can be improved.

In order to suppress the noise when the infrared emitting diode emits a light, a bypass capacitor BPCS is mounted on each of the small-sized boards on which the infrared transceivers TRIR1 to TRIR4 are mounted. Because an area of the bypass capacitor BPCS has to be smaller than an area of the infrared transceiver in the area of the small-sized board, the bypass capacitor BPCS that can be mounted on the small-sized board is limited to a small-sized one.

Also, because the wiring can be freely bent, the infrared transceivers can be arranged within the housing at desired angles.

Figure 10B:
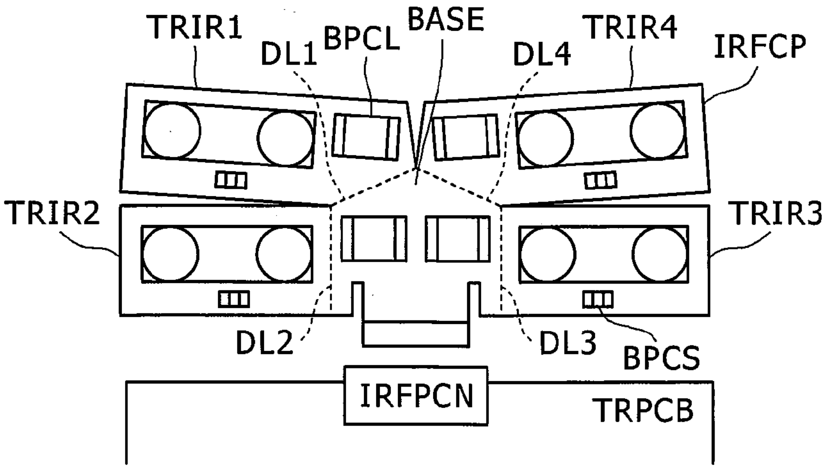
FIG. 10B is an illustrative view of the infrared transceiver implemented by a flexible substrate according to the embodiment of the present invention.

FIG. 10B is an illustrative view of the infrared transceivers TRIR1 to TRIR4 implemented by a flexible substrate according to the embodiment of the present invention.

The flexible substrate is formed of a printed circuit board configured by a multilayer film substrate which is thinner and more flexible than a normal substrate made of an epoxy resin.

The infrared transceivers TRIR1 to TRIR4 are implemented on a single flexible substrate, and a connector of the flexible substrate is connected to the main board TRPCB through a connector IRFPCN provided in the main board TRPCB.

The wiring from the connector of the flexible substrate to the respective infrared transceivers TRIR1 to TRIR4 is conducted on the flexible substrate at the time of manufacturing the flexible substrate. For that reason, at the time of assembling the nameplate type sensor terminal TR, the connector of the flexible substrate may be merely inserted into the connector IRFPCN of the main board TRPCB, and the wiring work in the infrared transceivers TRIR1 to TRIR4 is unnecessary.

Also, since the wiring from the main board TRPCB to the infrared transceivers TRIR1 to TRIR4 is printed on the flexible substrate, an area of the printed circuit board is larger than that of the small-sized substrate on which the infrared transceivers TRIR1 to TRIR4 illustrated in FIG. 10A are mounted. For that reason, a bypass capacitor BPCL larger in capacitance than the bypass capacitor BPCS can be also mounted on the flexible substrate. With this configuration, in the case where the infrared transceivers TRIR1 to TRIR4 are installed on the nameplate type sensor terminal TR with the use of the flexible substrate, the noise when the infrared emitting diode emits the light can be suppressed as compared with the case where the infrared transceivers TRIR1 to TRIR4 are implemented with the use of the wires IRIF1 to IRIF4.

Also, the flexible substrate has a bend where the flexible substrate is bent in order to arrange the infrared transceivers TRIR1 to TRIR4 as illustrated in FIGS. 8 and 9. The infrared transceivers TRIR2 and TRIR3 can be arranged to be oriented inward, and the infrared transceivers TRIR1 and TRIR4 can be arranged to be oriented inward and downward, by bending bends DL1 to DL4.

The bends DL1 to DL4 will be described with reference to FIGS. 11A and 11B.

Figure 11A:
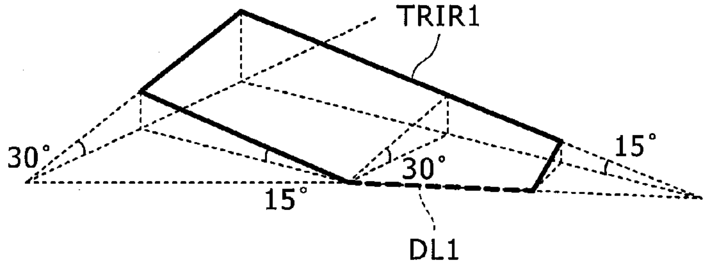
FIG. 11A is an illustrative view of a bend of the infrared transceiver in the flexible substrate according to the present invention.

FIG. 11A is an illustrative view of the bend DL1 of the infrared transceiver TRIR1 in the flexible substrate according to the present invention.

The bend DL1 is bent so that the infrared transceiver TRIR1 is arranged to be oriented inward toward the front side by 15 degrees, and oriented downward by 30 degrees.

A criterion of the arrangement angle of the infrared transceiver TRIR1 is an extension surface of a base portion BASE surrounded by the bends DL1 to DL4.

Although the bend DL4 will be omitted from the drawing, as with the bend DL1 described in FIG. 11A, the flexible substrate is bent along the bend DL4 so that the infrared transceiver TRIR4 is arranged to be oriented inward toward the front side by 15 degrees, and oriented downward by 30 degrees.

Figure 11B:
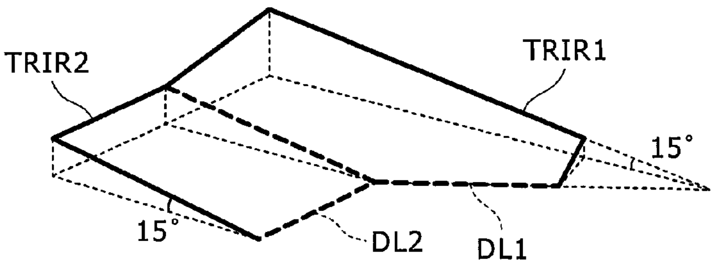
FIG. 11B is an illustrative view of a bend of the infrared transceiver in the flexible substrate according to the present invention.

FIG. 11B is an illustrative view of the bend DL2 of the infrared transceiver TRIR2 in the flexible substrate according to the present invention.

The bend DL2 is bent so that the infrared transceiver TRIR2 is arranged to be oriented inward toward the front side by 15 degrees.

As illustrated in FIG. 10B, since a notch is provided in the flexible substrate between portions in which the infrared transceivers TRIR1 and TRIR2 arranged vertically are mounted, the infrared transceiver TRIR2 can be arranged to be angled inward toward the front side while maintaining the installation angle of the infrared transceiver TRIR1.

Although the bend DL3 will be omitted from the drawing, as with the bend DL2 described in FIG. 11B, the flexible substrate is bent along the bend DL2 so that the infrared transceiver TRIR3 is arranged to be oriented inward toward the front side by 15 degrees.

As described above, the bends DL1 to DL4 between the infrared transceivers TRIR1 and TRIR2 arranged on the left side of the flexible substrate, and the infrared transceivers TRIR3 and TRIR4 arranged on the right side of the flexible substrate are bent whereby the infrared transceivers TRIR1 to TRIR4 can be arranged to be angled so that the optical axes approach each other. In a state where the bends DL1 to DL4 are bent, a space is formed between the front side of the base portion BASE of the flexible substrate, and the infrared transceivers TRIR1 to TRIR4 arranged to be angled. The bypass capacitor BPCL can be arranged in a dead space by mounting the bypass capacitor BPCL on the flexible substrate so as to be positioned in the space. As a result, since the arrangement space of the bypass capacitor BPCL does not need to be provided within the housing, the nameplate type sensor terminal TR can be reduced in size.

<Description of Face-to-Face Detection Infrared Communication System>

Figure 12:
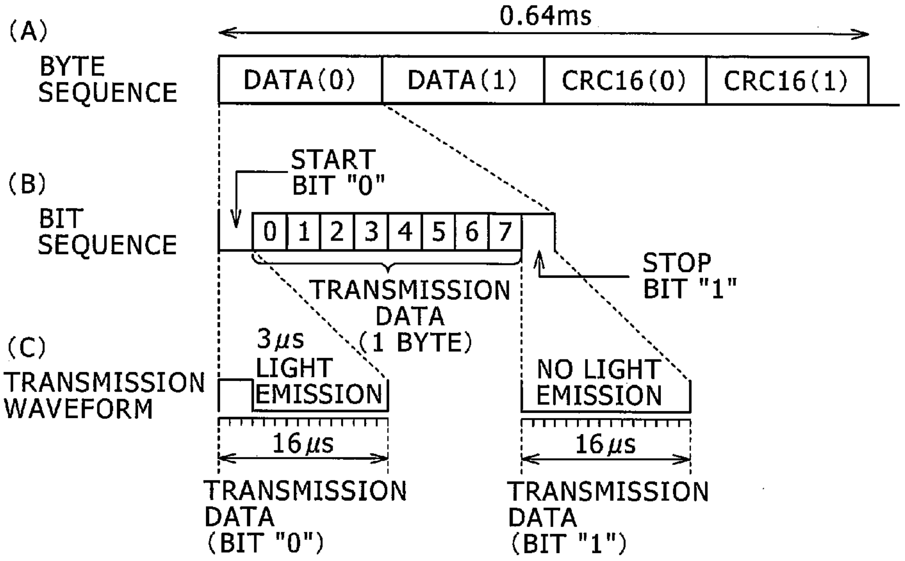
FIG. 12 is an illustrative view of infrared data transmitted or received by the infrared transceiver.

Subsequently, the infrared data transmitted and received by the infrared transceivers TRIR1 to TRIR4 will be described with reference to FIG. 12. FIG. 12 is an illustrative view of infrared data transmitted or received by the infrared transceiver TRIR1 to TRIR6.

As illustrated in FIG. 12(A), the infrared data is configured by a data string of 4 bytes in total. Specifically, the infrared data is configured by a data portion of two bytes, and a CRC 16 portion of two bytes. The terminal information TRMT is registered in the data portion, and information for determining whether the infrared data could be accurately received, or not, is registered in the CRC 16 portion.

The infrared data is encoded and transmitted for each byte. As illustrated in FIG. 12(B), the encoded infrared data for each byte is data of 10 bits in total including a start bit of 1 bit which is a logical value 0 indicative of a leading portion of each byte, data of 8 bits to be transmitted, and a stop bit of 1 bit which is a logical value 1 indicative of an end of each byte.

As illustrated in FIG. 12(C), it takes 16 μs for the infrared emitting diodes of the infrared transceivers TRIR1 to TRIR4 according to this embodiment to transmit 1 bit. For that reason, it takes 0.16 ms for the infrared emitting diodes to transmit the data string of 1 byte, and it takes 0.64 ms to transmit the overall data string of the infrared data. The time of 0.65 ms is a sufficiently short time as compared with 1 s of a transmission period when it is assumed that the infrared emitting diode transmits the infrared data once per 1 s, and is proper as a transmission period.

Also, FIG. 12(C) illustrates an example of a transmission waveform of 1 bit, and the infrared emitting diode does not emit a light if the bit is indicative of the logical value 1, and emits the light if the bit is indicative of the logical value 0.

When the infrared emitting diode emits the light because the logical value is indicative of 0, a light emission time, that is, a light emission pulse is made shorter than 16 μs which is the transmission time of 1 bit. With this configuration, a power consumption of the infrared emitting diode can be reduced. FIG. 12(C) illustrates an example in which the light emission time of the infrared emitting diode is 3 μs.

<Description of Area Detection Infrared Communication System>

Figure 13:
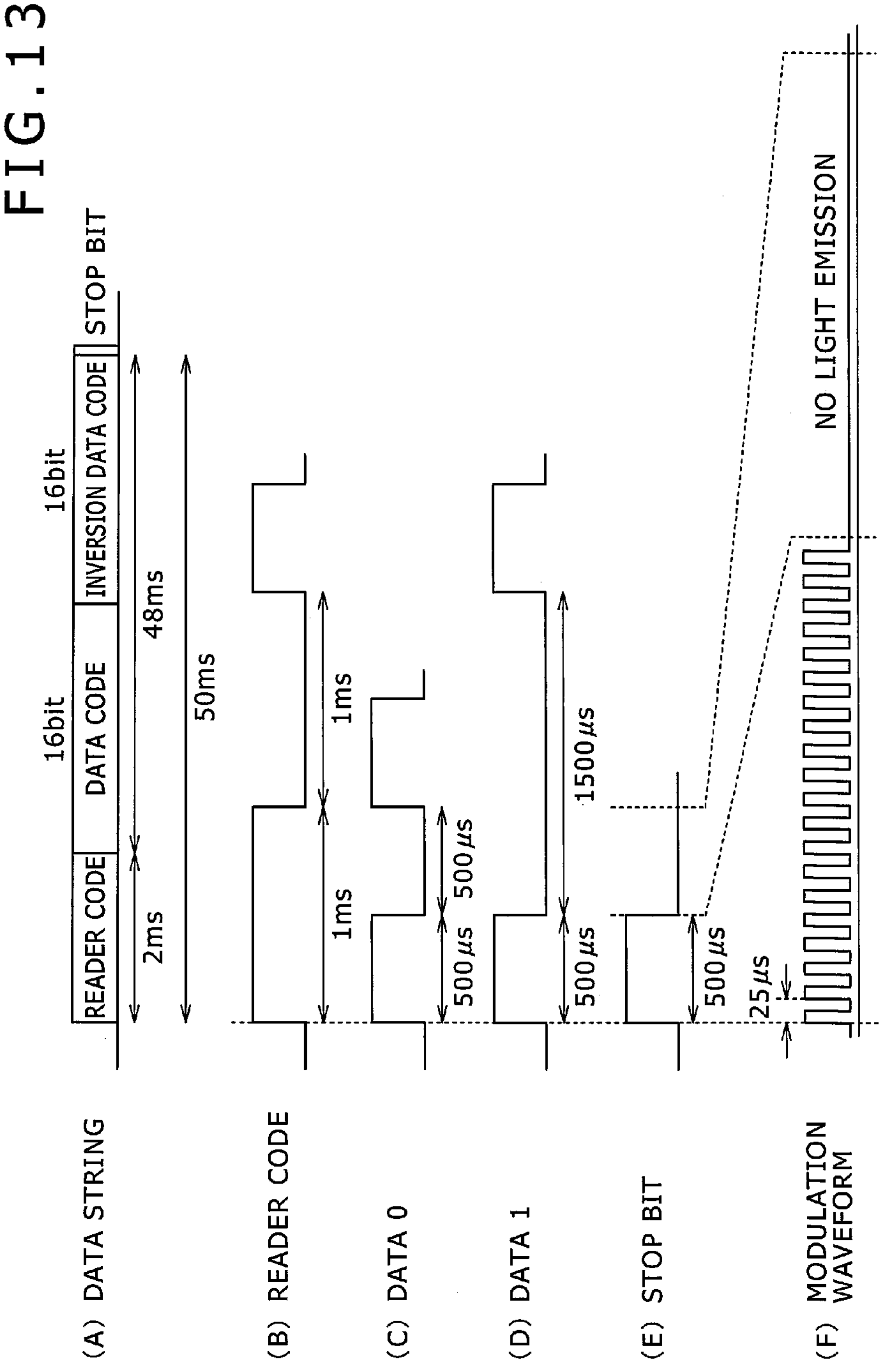
FIG. 13 is an illustrative view of infrared data transmitted by an area beacon according to the embodiment of the present invention.

The infrared data transmitted by the area beacon will be described with reference to FIG. 13. FIG. 13 is an illustrative view of the infrared data transmitted by an area beacon according to the embodiment of the present invention.

The infrared data transmitted by the area beacon is lower in directivity, and longer in transmittable distance than the infrared data transmitted and received by the infrared transceivers TRIR1 to TRIR6. It is preferable that the directivity of the infrared data transmitted by the area beacon is set so that the area beacon reception unit ABR of the nameplate type sensor terminal TR can receive the data even by the reflected light of the infrared data.

As illustrated in FIG. 13(A), the infrared data transmitted by the area beacon is configured by a reader code portion, a data code portion of 16 bits (2 bytes), an inversion data code portion of 16 bits (2 bytes), and a stop bit. Identification information of the area beacon is registered in the data code portion. A logical value obtained by inverting the logical value registered in the data code portion is registered in the inversion data code unit, and used for determining whether the infrared data could be accurately received, or not. The reader code portion is data indicative of a leading portion of the infrared data transmitted by the area beacon.

As illustrated in FIG. 12(B), the area beacon transmits the logical value 1 as the reader code for 1 ms, and transmits the local value 0 for 1 ms.

The infrared data transmitted by the area beacon is encoded and transmitted for each bit. If the bit information registered in the data code portion or the inversion data code portion is 0, as illustrated in FIG. 12C, the area beacon transmits the logical value 1 for 500 μs, and transmits the logical value 0 for 500 μs. Also, if the bit information registered in the data code portion or the inversion data code portion is 1, as illustrated in FIG. 12(D), the area beacon transmits the logical value 1 for 500 μs, and transmits the logical value 0 for 1500 μs. It is assumed that the area beacon emits the light if the logical value is 1, and does not emit the light if the logical value is 0.

The stop bit is indicative of a training portion of the infrared data. As illustrated in FIG. 12(E), the area beacon transmits the logical value 1 as the stop bit for 500 μs.

As illustrated in FIGS. 12(C) and 12(D), the transmission time is different depending on whether the bit information registered in the data code portion or the inversion data code portion is 0 or 1. However, since the bit information obtained by inverting certain bit information in the data code portion is registered in the inversion data code portion, for example, if one piece of bit information registered in the data code portion is 0, corresponding bit information in the inversion code portion is 1. That is, a time taken to transmit some bit information registered in the data code portion, and bit information corresponding to that bit information in the inversion data code portion is always 3 ms. Since 16 pairs of those bit information is included in the data code portion and the inversion data code portion, a time taken to transmit the data code portion and the inversion data code portion is 48 ms as illustrated in FIG. 13(A).

Since the time taken to transmit the reader code portion is 2 ms, the time taken for the area beacon to transmit the infrared data is 50 ms, and kept constant. The time of 50 ms is sufficiently short as compared with 10 s which is the transmission period when it is assumed that the area beacon transmits the infrared data once per 10 s, and is preferable as the transmission time.

Also, as illustrated in FIG. 13(F), a light emission pulse of the area beacon is converted into a short pulse. Specifically, the light emission pulse of the area beacon is modified into a pulse which is 40 kHz and 50% in duty ratio. With this configuration, the transmittable distance of the infrared data transmitted by the area beacon can be increased, and a display power at the time of emitting the infrared rays can be reduced.

The modulation frequency of the area beacon may be other than 40 kHz.

<Description that Two Kinds of Infrared Rays can be Received at the Same Time>

The nameplate type sensor terminal TR according to the present invention includes the infrared photo transistors of the infrared transceivers TRIR1 to TRIR6 that receive the infrared data transmitted from another nameplate type sensor terminal, and the area beacon reception unit ABR that receives the infrared data transmitted from the area beacon. In the following description, a communication of the infrared data between the respective nameplate type sensor terminals TR is called "face-to-face detection infrared communication", and a communication of the infrared data between the area beacon and the nameplate type sensor terminal TR is called "area detection infrared communication".

In general, when plural kinds of infrared data are communicated within the same space, a collision of different kinds of infrared data is problematic. The infrared data is communicated in pulse in the face-to-face detection infrared communication system according to the present invention, and the modulated infrared data is communicated in the area detection infrared communication system according to the present invention, thereby being capable of reducing an interference caused by the collision of the different kinds of infrared data.

In the face-to-face detection infrared communication system, as described in FIG. 12, the transmission time of 1 bit is 16 μs, and the transmission time of the overall infrared data is 0.64 ms. On the other hand, in the area detection infrared communication system, as described in FIG. 13, the transmission time when the bit information is 0 is 1 ms, and the transmission time when the bit information is 1 is 2 ms. The transmission time of the overall infrared data is 50 s. Accordingly, the transmission time of the overall infrared data in the area detection infrared communication system is larger than the transmission time of the overall infrared data in the face-to-face detection infrared communication system by about 78 times.

Figure 14:
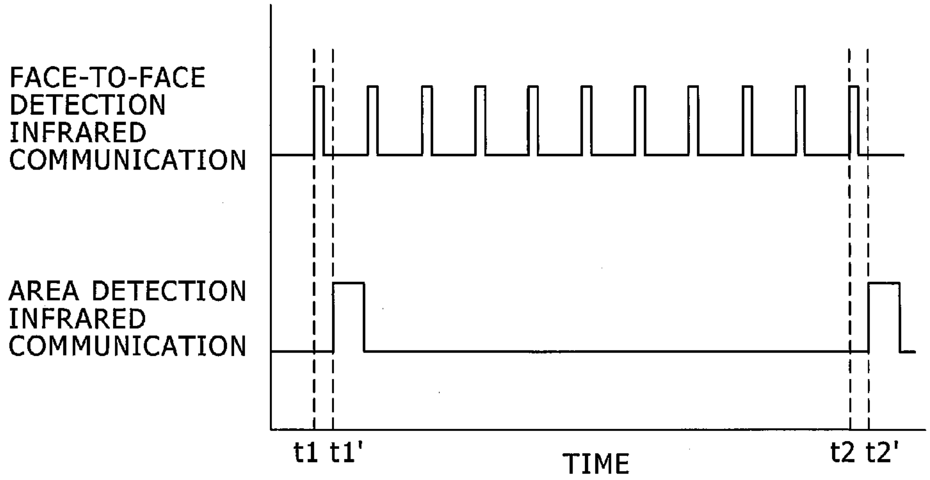
FIG. 14 is a comparative diagram of a transmission time of the infrared data in a face-to-face detection infrared communication system and a transmission time of the infrared data in an area detection infrared communication system according to the embodiment of the present invention.

FIG. 14 is a comparative diagram of the transmission time of the infrared data in the face-to-face detection infrared communication system and the transmission time of the infrared data in the area detection infrared communication system according to the embodiment of the present invention.

As illustrated in FIG. 14, the transmission period of the infrared data in the face-to-face detection infrared communication system is a 1 s cycle. On the other hand, the transmission period of the infrared data in the area detection infrared communication system is a 10 s cycle. For that reason, there is a low possibility that a transmission start time (t1, t2) of the infrared data in the face-to-face detection infrared communication system matches a transmission start time (t1', t2') of the infrared data in the area detection infrared communication system. Therefore, there is a low possibility that an interference of the different kind of infrared data occurs.

Also, because the modulated infrared data is communicated in the area detection infrared communication system, the area beacon reception unit ABR has a demodulation unit for demodulating the modulated infrared data. For that reason, even if the transmission start time of the infrared data in the face-to-face detection infrared communication system matches the transmission start time of the infrared data in the area detection infrared communication system, the demodulation unit of the area beacon reception unit ABR cannot demodulate the infrared data by a pulse used in the face-to-face detection infrared communication system. For that reason, the area beacon reception unit ABR does not receive the infrared data transmitted by the infrared transceivers TRIR1 to TRIR6 as the infrared data transmitted by the area beacon.

In the above example, the infrared transmit/receive unit AB modulates and transmits the infrared data, and the infrared transceivers TRIR1 to TRIR6 transmit the infrared data without modulation. Alternatively, even if the area beacon transmits the infrared data without modulation, and the infrared transceivers TRIR1 to TRIR6 modulate and transmit the infrared data, the interference can be prevented as in the above example.

Also, the area beacon, and the infrared transceivers TRIR1 to TRIR6 may modulate the infrared data. In this case, the modulation frequency of the area beacon and the modulation frequency of the infrared transceivers TRIR1 to TRIR6 are made different from each other. With the above configuration, the area beacon reception unit ABR cannot demodulate the infrared data transmitted by the infrared transceivers TRIR1 to TRIR6. Also, the infrared transceivers TRIR1 to TRIR6 cannot demodulate the infrared data transmitted by the area beacon. Therefore, the interference can be prevented.

<Configuration of Area Beacon>

Figure 15:
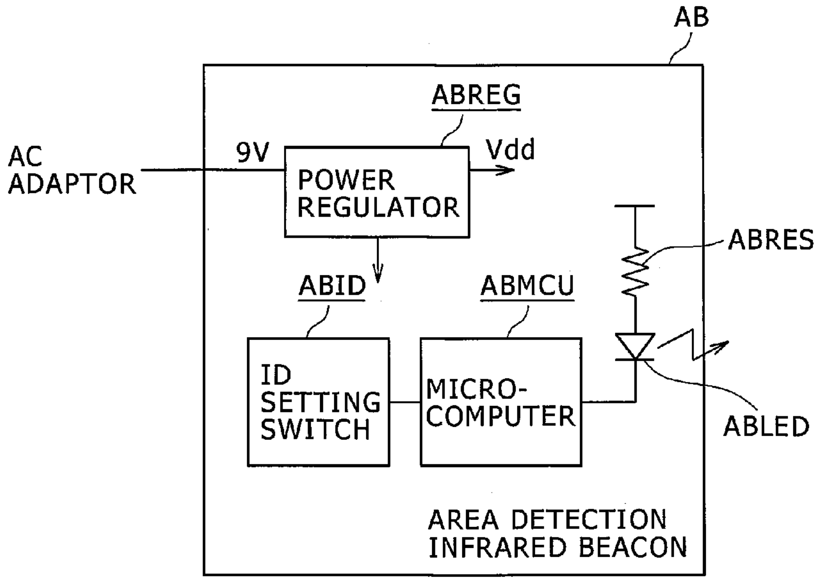
FIG. 15 is an illustrative view of a configuration of the area beacon according to the embodiment of the present invention.

Subsequently, the area beacon AB will be described with reference to FIG. 15. FIG. 15 is an illustrative view of a configuration of the area beacon AB according to the embodiment of the present invention.

In the embodiment according to the present invention, it is assumed that one or two area beacons AB are set in each room of the conference room and the cabin. Therefore, a power supply is applied to the area beacon AB through an AD adaptor that is arranged in the vicinity of a plug of AB100V arranged in each room, and connected from the plug to the area beacon.

A supply voltage (9 V) applied by the AC adaptor is used as a supply voltage (Vdd) that drops by a power regulator ABREG, and actuates a microcomputer ABMCU and an infrared emitting diode ABLED.

The microcomputer ABMCU analyzes the identification information (ID) of the area beacon AB set in an ID setting switch ABID, and encodes the identification information. Then, the microcomputer ABMCU modulates the encoded identification information, and allows the infrared emitting diode ABLED to emit a light, to thereby transmit the infrared data indicative of the identification information.

The light emission intensity of the infrared emitting diode ABLED can be adjusted by a current limiting resistor ABRES.

Also, in order to transmit more infrared data to a broader space, the area beacon AB may include a plurality of infrared emitting diodes ABLED.

<Transmit/Receive Sequence of Infrared Data>

As described in FIGS. 1B and 1C, the nameplate type sensor terminal TR is synchronized with the base station GW in time, and the operation is synchronized between the respective nameplate type sensor terminals TR on the basis of the time.

Figure 16:
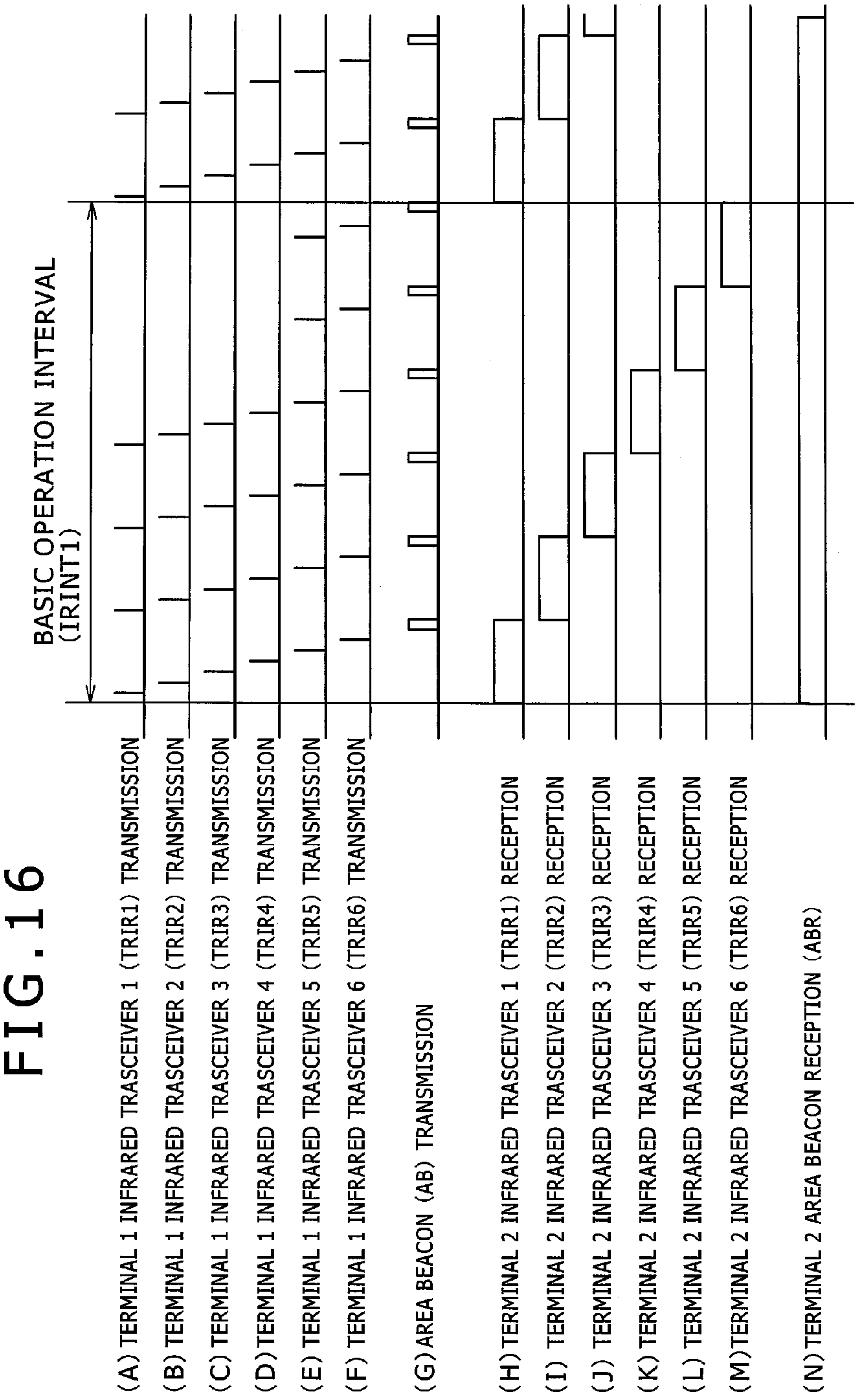
FIG. 16 is an illustrative view of a sequence of transmit/receive of the infrared data in the nameplate type sensor terminal according to the embodiment of the present invention.

FIG. 16 is an illustrative view of a sequence of transmit/receive of the infrared data in the nameplate type sensor terminal TR according to the embodiment of the present invention.

Referring to FIG. 16, a description will be given of a transmit/receive timing of the infrared data in the infrared transceivers TRIR1 to TRIR6, a transmit timing of the infrared data in the area beacon AB, and a receive timing of the infrared data in the area beacon reception unit ABR of the nameplate type sensor terminal TR2 when the wearer of the nameplate type sensor terminal TR1 and the wearer of the nameplate type sensor terminal TR2 face each other.

The infrared emitting diodes of the infrared transceivers TRIR1 to TRIR6 provided in the nameplate type sensor terminal TR periodically transmit the terminal information TRMT of the nameplate type sensor terminal TR as the infrared data at times different from each other.

FIG. 16(A) illustrates a timing at which the infrared emitting diode of the infrared transceiver TRIR1 provided in the nameplate type sensor terminal TR1 transmits the terminal information TRMT of the nameplate type sensor terminal TR1. Likewise, FIGS. 16B to 16F illustrate timings at which the infrared emitting diodes of the infrared transceivers TRIR2 to TRIR6 provided in the nameplate type sensor terminal TR1 transmit the terminal information TRMT of the nameplate type sensor terminal TR1.

If the infrared photo transistor of at least one infrared transceiver provided in the nameplate type sensor terminal TR2 can receive the infrared data only for a time taken for the infrared emitting diodes of all the infrared transceivers TRIR1 to TRIR6 to transmit the infrared data to the nameplate type sensor terminal TR1 once, the nameplate type sensor terminals TR2 can receive the terminal information TRMT of the nameplate type sensor terminal TR1.

As the number of infrared photo transistors of the infrared transceivers TRIR1 to TRIR6 which become in a receivable state at the same timing is smaller, the power consumption of the nameplate type sensor terminal TR can be more reduced.

FIGS. 16(H) to 16(M) exemplify a case in which the number of infrared transceivers that becomes in the receivable state at the same timing is one.

Specifically, as illustrated in FIG. 16(H), the infrared photo transistor of the infrared transceiver TRIR1 in the nameplate type sensor terminal TR2 becomes in the receivable state while the infrared transceivers TRIR1 to TRIR6 in the nameplate type sensor terminal TR1 transmit the infrared data at least once.

Also, as illustrated in FIGS. 16(I) to 16(M), the infrared photo transistors of the infrared transceivers TRIR2 to TRIR6 in the nameplate type sensor terminal TR2 are controlled to be in the receivable state in time sharing.

As illustrated in FIG. 16, the infrared photo transistors of the infrared transceivers TRIR1 to TRIR6 in the nameplate type sensor terminal TR is put into the receivable state in time sharing, thereby being capable of reducing the power consumption of the infrared photo transistors of the infrared transceivers TRIR1 to TRIR6 to ⅙ of normal or lower.

In order to put the infrared photo transistors of the infrared transceivers TRIR1 to TRIR6 in the nameplate type sensor terminal TR in the receivable state in time sharing, the nameplate type sensor terminal TR needs to grasp a time at which the infrared emitting diodes of all the infrared transceivers TRIR1 to TRIR6 in another nameplate type sensor terminal TR transmit the infrared data once. However, as described above, since the respective nameplate type sensor terminals TR synchronize the operation with each other, another nameplate type sensor terminal TR can grasp the transmission time of the infrared data.

In FIG. 16, while the infrared photo transistors of the infrared transceivers TRIR5 and TRIR6 of the nameplate type sensor terminal TR2 are in the receivable state, the infrared emitting diodes of the infrared transceivers TRIR1 to TRIR4 arranged on the front surface of the nameplate type sensor terminal TR1 do not transmit the infrared data, but only the infrared emitting diodes of the infrared transceivers TRIR5 and TRIR6 arranged on the left surface and the right surface of the nameplate type sensor terminal TR1 transmit the infrared data.

With the above configuration, the infrared photo transistors of the infrared transceivers TRIR5 and TRIR6 arranged on the left surface and the right surface of the nameplate type sensor terminal TR can be prevented from receiving the infrared data by the infrared emitting diodes of the infrared transceivers TRIR1 to TRIR4 arranged on the front surface of another nameplate type sensor terminal TR. That is, the nameplate type sensor terminal TR can prevent false detection of the facing of one wearer with another wearer who is located laterally to the one wearer, and merely faces the one wearer.

Also, since the respective nameplate type sensor terminals TR synchronize the processing with each other, the nameplate type sensor terminals TR may not always transmit or receive the infrared data. The nameplate type sensor terminal TR may switch the microcomputer MCU of the nameplate type sensor terminal which is not transmitting and receiving the infrared data to a low power consumption state in which the power consumption is lower than a normal state. With this configuration, the power consumption of the nameplate type sensor terminal TR can be reduced.

As has been described above, according to the present invention, the plurality of optical transmit/receive units is arranged so that the optical axes of the plurality of optical transmit/receive units approach each other outward of the housing. With this configuration, the opening portion of the housing can be reduced, the nameplate type sensor terminal TR can be reduced in size, and the toughness of the nameplate type sensor terminal TR can be improved.

Also, the plurality of optical transmit/receive units is implemented on the flexible substrate, and the wiring to the optical transmit/receive units is implemented on the flexible substrate. With this configuration, the wiring can be shortened as compared with a case where the main body substrate and the optical transmit/receive units are connected to each other by wire connection. The noise to the various sensors when the light is emitted can be reduced.

The present invention has been described above in detail with reference to the attached drawings. However, the present invention is not limited to the above specific configuration, but includes various changes and equivalent configurations without departing from the scope of the attached claims.

INDUSTRIAL APPLICABILITY

The present invention can be applied to a sensor terminal using an optical communication for the purpose of detecting the facing of the wearer.

The invention claimed is:

1. A sensor terminal that is worn by a person, and detects that respective wearers face each other by the aid of an optical communication, comprising:

a control unit that controls the sensor terminal; and a plurality of optical transmit/receive units each having at least one of a transmission unit that emits the light to transmit data, and a reception unit that receives the light to receive the data, wherein the plurality of optical transmit/receive units are arranged within a housing of the sensor terminal, wherein the plurality of optical transmit/receive units are arranged so that light emission axes of the transmission units, or extension lines of light detection axes of the reception units approaches each other, wherein the plurality of optical transmit/receive units each include the transmission units and the reception units, wherein the sensor terminal comprises:

a transmission unit switching unit that switches the transmission units included in the plurality of transmit/receive units to be valid or invalid, individually, and a reception unit switching unit that switches the reception units included in the plurality of transmit/receive units to be valid or invalid, individually, and wherein it is determined whether a valid reception unit to be diagnosed can receive the light emitted by the valid transmission unit to be diagnosed, or not, in a state where the transmission unit to be diagnosed is validated by the transmission unit switching unit, and the reception unit to be diagnosed is validated by the reception unit switching unit, to diagnose the abnormality of the transmission unit and the reception unit which are to be diagnosed.

2. The sensor terminal according to claim 1, comprising:

a main body substrate on which the control unit is implemented; and a flexible substrate which is bendable and on which the plurality of optical transmit/receive units is implemented, wherein lines to the plurality of optical transmit/receive units are implemented on the flexible substrate, and wherein the flexible substrate and the main body substrate are connected to each other through a connector.

3. The sensor terminal according to claim 1, comprising:

a flexible substrate which is bendable and on which the plurality of optical transmit/receive units is implemented, wherein the plurality of optical transmit/receive units are each arranged on a left side and a right side of the flexible substrate, and wherein the flexible substrate between at least one optical transmit/receive unit arranged on the left side, and at least one optical transmit/receive unit arranged on the right side is bent whereby the plurality of optical transmit/receive units is arranged so that the light emission exes of the transmission units or the extension lines of the light detection axes of the reception units approach each other.

4. The sensor terminal according to claim 1, wherein the plurality of optical transmit/receive units each includes the transmission unit, and wherein the transmission units of the plurality of optical transmit/receive units emit the light at times different from each other so that times at which the light is emitted do not overlap with each other.

5. The sensor terminal according to claim 1, wherein the plurality of optical transmit/receive units each includes the reception unit, and wherein the reception unit is controlled to a receivable state that can receive the light, and a non-receivable state that cannot receive the light, and wherein the control unit controls the reception units of parts of the optical transmit/receive units to be in the receivable state at the same timing.

6. The sensor terminal according to claim 1, wherein the plurality of optical transmit/receive units each includes the transmission unit, wherein the sensor terminal is synchronized in time with another sensor terminal, and wherein the control unit controls the transmission units of the plurality of optical transmit/receive units to emit the light at a time when the another sensor terminal does not emit the light.

7. The sensor terminal according to claim 1, comprising a position information reception unit that receives the light indicative of position information emitted by a position information transmitter arranged within a room to receive the position information, wherein the plurality of transmit/receive units includes the transmission units, and wherein the light emitted by the transmission units included in the plurality of transmit/receive units is higher in linearity than the light emitted by the position information transmitter.

8. The sensor terminal according to claim 7, wherein the light emitted by the transmission units provided in the plurality of transmit/receive units, and the light emitted by the position information transmitter are modulated, and wherein both of the modulated light are modulated at different frequencies.

* * * * *